(12) United States Patent
Krone

(10) Patent No.: US 10,440,931 B2
(45) Date of Patent: Oct. 15, 2019

(54) ARM DEVICE FOR A MILKING PARLOR ARRANGEMENT FOR THE AUTOMATIC MILKING OF MILK-PRODUCING ANIMALS, DIVIDER FOR A MILKING PARLOR ARRANGEMENT, AND MILKING PARLOR ARRANGEMENT

(71) Applicant: GEA Farm Technologies GmbH, Bönen (DE)

(72) Inventor: Otto Krone, Laggenbeck (DE)

(73) Assignee: GEA Farm Technologies GmbH, Bönen (DE)

( * ) Notice: Subject to any disclaimer, the term of this patent is extended or adjusted under 35 U.S.C. 154(b) by 147 days.

(21) Appl. No.: 15/311,941

(22) PCT Filed: May 20, 2015

(86) PCT No.: PCT/EP2015/061087
§ 371 (c)(1),
(2) Date: Nov. 17, 2016

(87) PCT Pub. No.: WO2015/177198
PCT Pub. Date: Nov. 26, 2015

(65) Prior Publication Data
US 2017/0086419 A1   Mar. 30, 2017

(30) Foreign Application Priority Data
May 20, 2014   (DE) .................. 10 2014 107 124

(51) Int. Cl.
*A01J 5/00*   (2006.01)
*A01J 5/017*   (2006.01)
*A01K 1/12*   (2006.01)

(52) U.S. Cl.
CPC .............. *A01J 5/0175* (2013.01); *A01K 1/12* (2013.01)

(58) Field of Classification Search
CPC ............. A01J 5/00; A01J 5/0175; A01J 5/017
See application file for complete search history.

(56) References Cited

U.S. PATENT DOCUMENTS 2,357,373 A   9/1944   Anderson
3,448,725 A   6/1969   Holm et al.
(Continued)

FOREIGN PATENT DOCUMENTS

DE   3931769   4/1991
DE   4101530 A1   7/1992
(Continued)

OTHER PUBLICATIONS

Final Office Action dated Sep. 21, 2018, U.S. Appl. No. 14/384,678, 23 pages.
(Continued)

*Primary Examiner* — Kristen C Hayes
(74) *Attorney, Agent, or Firm* — Smith Law Office; Jeffry W. Smith

(57) ABSTRACT

An arm device for a milking parlor arrangement for the automatic milking of milk-producing animals comprises an arm and a holder, which is coupled to the arm in a pivotable manner and has a milking cluster, wherein the arm is connected to an arm-drive shaft and is mounted such that it can be rotated about an arm axis, wherein a holder-drive shaft is mounted in the arm-drive shaft such that it can be rotated independently of the arm-drive shaft, wherein the arm-drive shaft and the holder-drive shaft are designed such that they can be coupled to a drive unit, wherein the arm device has at least one transmission element in the form of a pulling means for transmitting rotary or pivoting movements. The at least one transmission element is fixed in each case to respective wheels, with which it interacts in order to transmit rotary or pivoting movements. The invention also (Continued)

relates to a divider for a milking parlor arrangement having said arm device, and to a milking-parlor arrangement.

32 Claims, 18 Drawing Sheets

(56) References Cited

U.S. PATENT DOCUMENTS

| | | | |
|---|---|---|---|
| 3,861,355 A * | 1/1975 | Johnson | A01J 5/017 |
| | | | 119/14.08 |
| 3,870,021 A | 3/1975 | Nederbragt | |
| 4,171,684 A | 10/1979 | Herr et al. | |
| 4,401,055 A | 8/1983 | Street et al. | |
| 4,508,058 A | 4/1985 | Jakobson et al. | |
| 4,838,207 A | 6/1989 | Fraas et al. | |
| 4,941,433 A | 7/1990 | Hanauer | |
| 5,042,428 A | 8/1991 | Van Der Lely et al. | |
| 5,056,466 A | 10/1991 | Dessing et al. | |
| 5,383,423 A | 1/1995 | Van Der Lely | |
| 5,524,572 A * | 6/1996 | Dessing | A01J 5/0175 |
| | | | 119/14.02 |
| 5,586,518 A | 12/1996 | Carrano | |
| 5,595,945 A | 1/1997 | Wicks | |
| 5,596,945 A | 1/1997 | Van Der Lely | |
| 5,606,932 A | 3/1997 | Van Der Lely | |
| 5,678,506 A | 10/1997 | Van Der Berg | |
| 5,697,324 A | 12/1997 | Van Der Lely | |
| 5,718,185 A | 2/1998 | Pichler et al. | |
| 5,718,186 A | 2/1998 | Van Der Lely | |
| 5,784,994 A | 7/1998 | Van Der Lely | |
| 5,862,776 A | 1/1999 | Van Den Berg | |
| 5,918,566 A | 7/1999 | Van Den Berg | |
| 5,979,359 A | 11/1999 | Hansson | |
| 6,044,793 A | 4/2000 | Van Der Lely | |
| 6,050,219 A | 4/2000 | Van Der Lely | |
| 6,116,188 A | 9/2000 | Van Der Lely | |
| 6,148,766 A | 11/2000 | Van Der Lely | |
| 6,205,949 B1 | 3/2001 | Van Den Berg | |
| 6,213,051 B1 | 4/2001 | Fransen | |
| 6,244,215 B1 | 6/2001 | Oosterling | |
| 6,279,507 B1 | 8/2001 | Van Der Lely et al. | |
| 6,363,883 B1 | 4/2002 | Birk | |
| 6,382,130 B1 | 5/2002 | Rooney | |
| 6,386,141 B1 | 5/2002 | Forsen et al. | |
| 6,450,118 B1 | 9/2002 | Eppers, Jr. | |
| 6,584,929 B2 | 7/2003 | Van Der Lely et al. | |
| 6,814,027 B2 | 11/2004 | Hein et al. | |
| 6,843,203 B2 | 1/2005 | Johannesson et al. | |
| 7,104,218 B2 | 9/2006 | Teckentrup et al. | |
| 7,131,394 B2 | 11/2006 | Johannesson et al. | |
| 7,246,571 B2 * | 7/2007 | Van Den Berg | A01J 5/0175 |
| | | | 119/14.02 |
| 8,015,941 B2 | 9/2011 | Hallström | |
| 8,281,744 B2 | 10/2012 | Van Den Berg | |
| 8,281,746 B2 | 10/2012 | Nilsson et al. | |
| 8,286,583 B2 | 10/2012 | Van Den Berg | |
| 8,646,412 B2 | 2/2014 | Eriksson | |
| 9,107,378 B2 | 8/2015 | Hofman | |
| 9,161,512 B2 | 10/2015 | Hofman | |
| 9,215,858 B2 | 12/2015 | Johannesson et al. | |
| 9,426,966 B2 | 8/2016 | Krone | |
| 9,491,924 B2 | 11/2016 | Hofman | |
| 9,549,530 B2 | 1/2017 | Harty et al. | |
| 9,730,424 B2 | 8/2017 | Krone et al. | |
| 9,848,576 B2 | 12/2017 | Krone et al. | |
| 9,918,450 B2 * | 3/2018 | Krone | A01J 5/0175 |
| 2001/0028021 A1 | 10/2001 | Martin | |
| 2005/0066904 A1* | 3/2005 | Berg | A01J 5/0175 |
| | | | 119/14.08 |
| 2005/0072363 A1 | 4/2005 | Van Der Lingen et al. | |
| 2007/0277737 A1 | 12/2007 | Maier | |
| 2009/0007850 A1 | 1/2009 | Mehinovic | |
| 2010/0186676 A1 | 7/2010 | Van Den Berg | |
| 2010/0326361 A1 | 12/2010 | Van Den Berg | |

| | | |
|---|---|---|
| 2014/0060436 A1 | 3/2014 | Krone |
| 2015/0020738 A1 | 1/2015 | Krone et al. |
| 2015/0020739 A1 | 1/2015 | Krone et al. |
| 2015/0059649 A1 | 3/2015 | Van Der Sluis |
| 2015/0189854 A1 | 7/2015 | Krone et al. |
| 2015/0296737 A1 | 10/2015 | Krone et al. |
| 2017/0042110 A1 | 2/2017 | Krone et al. |
| 2018/0020632 A1 | 1/2018 | Krone et al. |

FOREIGN PATENT DOCUMENTS

| | | |
|---|---|---|
| DE | 4113700 A1 | 10/1992 |
| DE | 4237949 A1 | 5/1994 |
| DE | 4339131 A1 | 5/1995 |
| DE | 29522237 U1 | 12/2000 |
| DE | 102006027919 | 12/2006 |
| DE | 102006049948 A1 | 4/2007 |
| DE | 202012005042 U1 | 10/2013 |
| DE | 60106877 T3 | 6/2014 |
| EP | 0576085 A2 | 12/1993 |
| EP | 0647390 | 4/1995 |
| EP | 0647391 A2 | 4/1995 |
| EP | 0689762 A1 | 1/1996 |
| EP | 0736246 A1 | 10/1996 |
| EP | 0734649 A2 | 3/1997 |
| EP | 0811319 | 12/1997 |
| EP | 0689762 | 8/2000 |
| EP | 0657097 | 2/2002 |
| EP | 0862360 | 3/2003 |
| EP | 1084611 B1 | 9/2004 |
| EP | 0551960 | 9/2006 |
| EP | 1263283 B2 | 3/2014 |
| EP | 3335548 A1 | 6/2018 |
| GB | 1383038 | 2/1975 |
| RU | 2244417 C2 | 1/2005 |
| RU | 2279796 C2 | 7/2006 |
| WO | 93/13651 | 7/1993 |
| WO | 94/23565 | 10/1994 |
| WO | 96/01041 | 1/1996 |
| WO | 96/07314 | 3/1996 |
| WO | 96/19916 | 7/1996 |
| WO | 96/19917 | 7/1996 |
| WO | 98/04121 | 2/1998 |
| WO | 98/05201 | 2/1998 |
| WO | 98/3121 | 7/1998 |
| WO | 98/46069 A1 | 10/1998 |
| WO | 00/13492 A1 | 3/2000 |
| WO | 00/13495 | 3/2000 |
| WO | 01/67852 A1 | 9/2001 |
| WO | 02/15676 | 2/2002 |
| WO | 2008/030084 A2 | 3/2008 |
| WO | 2008/118068 A1 | 10/2008 |
| WO | 2010/052156 A1 | 5/2010 |
| WO | 2011/098454 A1 | 8/2011 |
| WO | 2011/098994 | 8/2011 |
| WO | 2013/135842 A1 | 9/2013 |
| WO | WO-2013135842 A1 * | 9/2013 ............ A01J 5/0175 |

OTHER PUBLICATIONS

Final Office Action dated Sep. 21, 2018, U.S. Appl. No. 14/384,668, 24 pages.
Germania Home Page on Jul. 28, 2005, http://www.germaniadairy.com/, 1 page.
BOUMATIC Home Page on Jul. 28, 2005, http://www.bou-matic.com/html/gallery/rotary_curtin.htm, 2 pages.
WestfaliaSurge brochure "External Autorotor" dated Jan. 2001, 22 pages.
Germania sales brochure "Introducing—Profundly Productive PRO-TIME Parlors From Germania: Milking Parlors for the Next Century—and Beyond?" printed Nov. 1996, 8 pages.
Germania Dutch brochure "Vele Nederlandse melkveehouders ginge u voor!: Germania Melksystemen de trots van eleke veehouder", 6 pages.
"Offer of Germania milking systems VOF, Oude Lievervelderweg2. 7137 MA Lievelde, NL, to Mr Hummel, Am Milchweg 01,Ivenack, DE, dated Aug. 12, 1997, 10 pages."

(56) References Cited

OTHER PUBLICATIONS

"Fax cover sheet of a Germania milking system VOF fax,Lievelde, NL, sent to M. Hummel Jul. 10, 1997, 1 page."
Germania Final Quality Control/Inspection Certificate, dated Oct. 9, 1999, 1 page.
Germania technical drawing titled "Protime I Stall" dated May 10, 1997, 1 page.
Photos of a Germania double-herringbone parlor installed in Hummel GmbH cattle plant in 1999, 13 pages.
Westfalia Landtechnik GmbH advertising brochure "AutoRotor—Milk Carousel Systems" publication date Feb. 1997, 12 pages.
Westfalia Separator AG order confirmation and invoice dated Aug. 17, 1995, 22 pages.
Photos of a Westfalia Separator AG milking parlor installation at the Birkholz Estate, dated Sep. 2018, 7 pages.
"Reflections: A history of DeLaval" 5 pages.
International Search report for International Application No. PCT/EP2013/055265 dated May 28, 2013, 7 pages.
International Search report for International Application No. PCT/EP2013/055272 dated May 28, 2013, 9 pages.
International Search Report in for International Application No. PCT/EP2013/055288 dated May 24, 2013, 9 pages.
International Search Report for PCT Application No. PCT/EP2013/055270 dated May 28, 2013, 13 pages.
German Search Report dated Feb. 17, 2012 from German Patent Application No. 102011001404.7, 6 pages.
International Preliminary Report on Patentability and Written Opinion for PCT/EP2012/054645, English translation dated Sep. 24, 2013, 6 pages.
Non-Final Office Action dated Sep. 24, 2015, U.S. Appl. No. 14/002,076, 8 pages.
Non-Final Office Action dated Feb. 10, 2017, U.S. Appl. No. 15/247,544, 7 pages.
Non-Final Office Action dated Apr. 7, 2016, U.S. Appl. No. 14/002,610, 7 pages.
Non-Final Office Action dated Jun. 2, 2017, U.S. Appl. No. 14/002,610, 10 pages.
Final Office Action dated Dec. 19, 2016, U.S. Appl. No. 14/002,610, 6 pages.
Final Office Action dated Feb. 27, 2017, U.S. Appl. No. 14/384,678, 15 pages.
Non-Final Office Action dated Mar. 11, 2016, U.S. Appl. No. 14/384,678, 15 pages.
Non-Final Office Action dated Dec. 7, 2016, U.S. Appl. No. 14/384,676 15 pages.
International Search Report for PCT/EP2015/061087 dated Sep. 7, 2015, 7 pages.
Non-Final Office Action dated Oct. 26, 2017, U.S. Appl. No. 14/384,668, 23 pages.
Non-Final Office Action dated Jan. 4, 2018, U.S. Appl. No. 14/384,678, 29 pages.
German Search Report dated Feb. 2, 2015 for German Application No. 10 2014 107 124.7, 6 pages.
Extended European Search Report for EP Application No. 18154736 dated May 2, 2018, 1 page.

\* cited by examiner

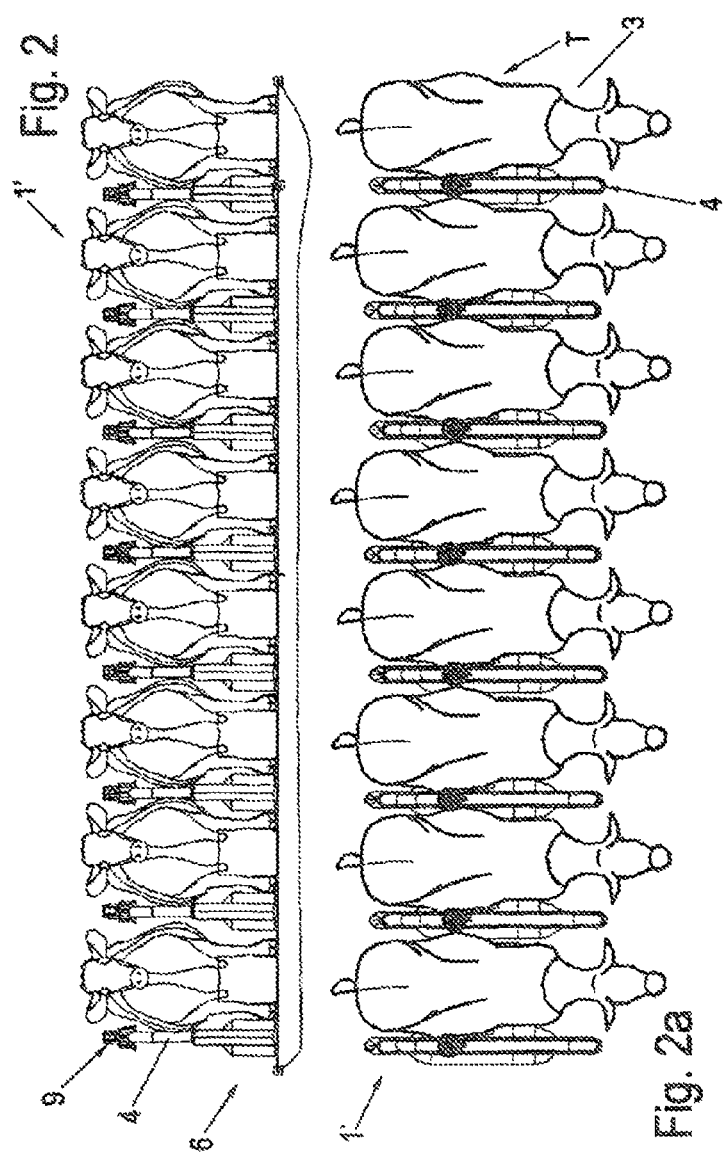

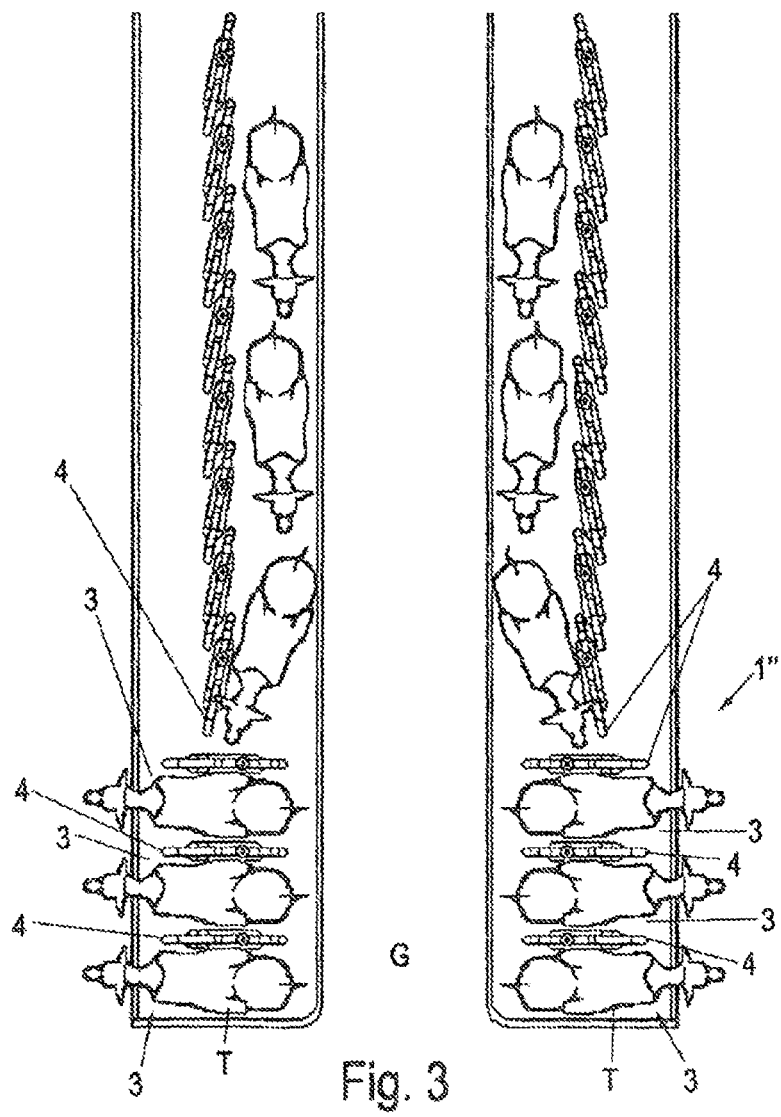

ARM DEVICE FOR A MILKING PARLOR ARRANGEMENT FOR THE AUTOMATIC MILKING OF MILK-PRODUCING ANIMALS, DIVIDER FOR A MILKING PARLOR ARRANGEMENT, AND MILKING PARLOR ARRANGEMENT

CROSS REFERENCE TO RELATED APPLICATIONS

This application is a national phase application under 35 U.S.C. § 371 of PCT International Application No. PCT/EP2015/061087, filed May 20, 2015, which claims priority to German Application No. 10 2014 107 124.7 filed May 20, 2014, the disclosures of which are incorporated by reference herein.

FIELD AND BACKGROUND OF THE INVENTION

The invention relates to an arm device for a milking parlor arrangement for the automatic milking of milk-producing animals according to the preamble of claim 1. The invention also relates to a divider of a milking parlor arrangement and to a milking parlor arrangement.

Such an arm device for a milking parlor arrangement is used for the mechanical or automatic milking of milk-producing animals. Such a device is also designated in general as a milking robot. Milk-producing animals are, for example, cows, goats, sheep etc. The milking parlor arrangement comprises milking parlors which are divided by dividers. The milking operation can be automated by means of the milking robot. Rotary milking parlors, for example, are used.

The term milking parlor arrangement is to be understood as arrangements of milking parlors, an angular position of an animal to be milked or an angular position of an imaginary longitudinal axis of an animal to be milked in a milking parlor with respect to a reference point or to a reference line being able to be between 0° and 90°. A pit or an area that is accessible by staff (e.g. working process) which is the area the milking staff occupy, is used, for example, as a reference point. The longitudinal side of a straight pit or a tangent of a circular pit is used, for example, as a reference line.

Milking parlor arrangements are, for example, movable and non-movable milking parlor arrangements. Movable milking parlor arrangements are, for example, rotary milking parlors as external milkers and internal milkers, both types with an arbitrary direction of rotation. So-called side-by-side milking parlors can also be realized as movable milking parlor arrangements. In addition, group milking parlors are also non-movable, such as, for example, herringbone milking parlors and tandem milking parlors. Said list is only provided as an example and is not limiting.

WO 2013/135842 A1 describes a divider of a milking parlor arrangement for at least one milking parlor for milking milk-producing animals. Various solutions for arm devices are specified.

The proposed solutions have proven their worth. Nevertheless, ever increasing demands in particular for high throughput figures and continuous operation in the case of today's milking robots, which are complicated and costly, require several milking parlors to be used in common. This can have a disadvantageous effect, among other things on account of the high level of complexity and a resultant high level of failure probability, on account of the intermittent operation and the areas that are off-limits to the staff (safety in the robot area). Raised demands for repeat accuracy and precision are reflected, in particular, in the costs.

SUMMARY OF THE INVENTION

Against said background, the object of the invention is to provide an improved arm device for a milking parlor and to improve the possible system throughput.

An arm device according to the invention for a milking parlor arrangement for automatically milking milk-producing animals includes an arm and a holder, which is pivotably coupled therewith and has a milking cluster, wherein the arm is connected to an arm drive shaft and is mounted so as to be rotatable about an arm axis, wherein a holder drive shaft is mounted in the arm drive shaft so as to be rotatable independently of the arm drive shaft, wherein the arm drive shaft and the holder drive shaft are realized so as to be couplable with a drive unit, wherein the arm device comprises at least one transmission element as tensile means for transmitting rotary or pivoting movements. The at least one transmission element is fixedly connected in each case to respective wheels, with which it interacts for transmitting rotary or pivoting movements.

Transmission of pivoting movements in each case between a wheel of a drive and a wheel of an output is made possible in an advantageously play-free manner by means of said transmission element. As only pivoting movements (up to a maximum of 180°) occur, it is possible to fasten the transmission element to a respective wheel. In one realization, the at least one transmission element is realized from a metal band.

Compared to the tensile means from the prior art, the transmission element produced from a metal band offers particular advantages, such as, for example, quasi constant acceleration and speed in the case of rotary or pivoting operations. Thus, the polygonal effects typical for chains do not occur. In addition, creeping and other problems of belts, toothed belts etc. do not arise.

In one realization, the at least one transmission element is a spring steel band. It can be, for example, a stainless-steel band, the material 1.410 being possible. Said stainless steel is additionally rust-resistant and is consequently advantageous in the area of application precisely underneath the animals.

In addition, the production costs for such a transmission element are low and high forces are able to be transmitted.

In addition, the metal material of the transmission element can be post-treated, it being possible, for example, for a "tempering" to increase a resistance to wear of the transmission element in an advantageous manner.

In this connection, the wrap portions of the transmission element around the drive/output wheels can comprise a bending elasticity with a bending center point in the axis of the respective drive/output wheel, such elasticity not being present in the pulling direction of the transmission element.

In another realization, the at least one transmission element interacts with rollers. This produces a particular ease of operation of the arm device connected to a low amount of wear, in particular on account of the wheels and/or rollers having fewer bearing forces.

In addition, it is provided that the wheels and/or rollers comprise in each case an outside diameter which is greater than a minimum bending radius of the at least one transmission element. In this way, the material of the transmission element remains within the elastic range and is not deformed. In addition, advantageous controllability is produced as, for example, no constant deformations occur in operation.

Thus, in one realization the at least one transmission element can comprise a width which corresponds to an outside diameter of the wheels and/or rollers.

High tolerances, which can bring about bad adjustability, are not necessary. In addition, the freedom from play of the transmission element does not produce any play or only very slight play on the milking cups or teat cups.

In yet another realization, the wheels and/or rollers are provided with openings and/or circumferential grooves for dirt removal. Thus, a self-cleaning effect is obtained with simple means. In addition, there is a weight advantage.

In another realization, at least one of the rollers is realized as a guide roller for guiding the at least one transmission element and at least one of the rollers is realized as a pressing roller for prestressing the at least one transmission element. On account of the spring steel material of the transmission element, only slight prestressing is necessary. Guiding is simplified to simple rollers. Said rollers can also serve at the same time for dirt removal.

In a further realization, the at least one transmission element is fixedly connected to the respective wheels, with which it interacts for transmitting rotary or pivoting movements, in each case by way of a fastening device. As only pivoting movements occur (up to a maximum of 180°), pivoting limits provided by additional limits/stops are necessary. Said limits/stops can be realized in a simple manner with the fastening device as a further function, it being possible, for example, for a portion or/and a component of the fastening device to interact with a fixed part or/and projection of a housing.

It is provided in one realization that the fastening device includes at least one fastening element and at least one sliding block. As a result, a simple, effective and easily exchangeable connection is possible. Said sliding block can form, for example, on the one hand, the function of a fastening of the transmission element on the respective wheel and, on the other hand, a pivoting limit in combination with a fixed stop. Naturally, it is also possible for an additional component, such as, for example, a screw or a bolt, to be fastened on the sliding block to limit the pivoting movement.

In addition, it is provided in this connection that the at least one fastening element of the fastening device comprises at least one centering portion which interacts in a substantially play-free manner with at least one fastening opening of the at least one transmission element in the pulling direction of the at least one transmission element. In this way, advantageous freedom from play can be achieved in this connection in a simple manner using commercially available fitting screws.

It is additionally provided that the at least one fastening opening of the at least one transmission element comprises a length with a rough tolerance in a direction parallel to an axis of the respective wheel. Mounting and replacement can be facilitated in this way.

In a further realization, at least one transmission element for transmitting rotary or pivoting movements to the holder are arranged on the arm or in the arm. As a result, the weight of the arm is reduced and the advantages of the transmission element realized as a spring steel band are able to be fully exploited.

In yet a further realization, at least one guide roller for guiding the at least one transmission element and at least one pressing roller for prestressing the at least one transmission element are provided on the arm or in the arm.

In another realization, the arm comprises a housing which is realized with one or multiple parts. Additional protection against dirt is made possible as a result. In addition, a compact unit is produced.

In yet another realization, it is provided that at least one mounting opening is formed on the arm or in the arm. The advantage of such a mounting opening is that, for example, the fastening devices of the transmission elements are able to be reached easily and quickly through the same.

It is provided that the drive unit to be assigned to the arm device comprises an arm drive for driving the arm, a holder drive for driving the holder and a vertical drive for the vertical adjustment of the arm device, wherein the arm drive and the holder drive are mounted in a frame. As the motors are not arranged in the joints, the motors are not situated in the dirty and wet area and can consequently comprise fewer types of protection. In addition, motors in the joints increase the moving masses, which signifies bad adjustability which, however, is no longer present here.

In this connection, a stressing device can be provided for stressing the at least one transmission element as a result of displacing the arm drive. Naturally, in place thereof or in addition thereto, a pressing roller (or even several pressing rollers) can be used for prestressing.

In a further realization, the arm drive, the holder drive and the vertical drive of the drive unit including associated transmissions and a bearing unit of the arm drive shaft and of the holder drive shaft form a common base of the arm device in the frame. This produces the particular advantage that the weight of the arm and the holder is considerably reduced compared to arm devices with integrated motors and transmissions. The arm and the holder simply exert only an advantageously small amount of kinetic energy in x-y planes in operation (only slow movements with a small degree of accuracy are effected in the z direction). This, in turn, produces the advantage that a milker and the automatic arm device are able to work with the milking cluster at the same time on the animal to be milked during a milking operation (positioning, attaching, milking, possible re-attaching, removing). A particular protected area is consequently not necessary. In addition, an advantage consists in that it is made easier to actuate the arm unit in x-y planes as the arm unit comprises significantly less lag on account of the reduced inertia and requires smaller acceleration forces.

In a further realization, the arm and the holder of the arm device are pivotable independently of one another. Simple adjustability of the positions of the arm and of the holder are produced as a result.

A divider according to the invention of a milking parlor arrangement for at least one milking parlor for milking milk-producing animals is provided, wherein the divider is arranged on a longitudinal side of the milking parlor. The divider comprises a drive unit and an arm device which is coupled to said drive unit and includes an arm and a holder, which is pivotably coupled thereto and has a milking cluster, and which is adjustable from a park position into an operating position and back, wherein in the park position the arm device is arranged with the milking cluster in the divider and in the operating position is adjustable laterally to one of the animals to be milked between the front and hind legs thereof. The arm device is the above-described arm device.

In a preferred realization, the arm drive, the holder drive and the vertical drive of the drive unit including associated transmissions and a bearing unit of the arm drive shaft and of the holder drive shaft form a common base of the arm device in the frame and are arranged in a center portion of the divider. This produces an advantageously compact design.

In the case of a milking parlor arrangement with right-angled milking parlors which are arranged side by side and each comprise parallel longitudinal sides, such as, for example, is the case with a side-by-side arrangement, the divider is arranged parallel to an imaginary longitudinal axis of the animal to be milked. In this case, it is assumed for reasons of simplification that in an ideal state the animal to be milked stands still with its imaginary longitudinal axis during the milking operation.

In the event of a milking parlor arrangement with milking parlors that are arranged in a circular manner such as in the case of a rotary milking parlor, the longitudinal sides of the milking parlors are not parallel. In said case, the longitudinal sides are segments of radii of a circle of the rotary milking parlor and intersect in the imaginary extension in the center point of said circle or in the pivot point of the rotary milking parlor, forming a center point angle. The imaginary longitudinal axis of the animal to be milked also runs in the ideal case through the pivot point and halves the center point angle. Said case is abbreviated here in the rest of the document by the term "approximately parallel".

An animal to be milked can enter into the milking parlor, which is provided with the divider, without coming into contact with the arm device. The milking cluster is not adjusted from the side into the operating position beneath the animal until the animal is standing in the milking parlor. It can be necessary for this purpose, when the animal is changed, for the entire divider to be moved out of a rest position into an ideal milking position for the new animal, for example in the longitudinal direction of the divider. The realization of the divider is designed such that no additional space requirement is created. This results in the advantage that the animals are able to continue to stand belly to belly. This has further advantages: On the one hand, many animals can be milked in this way in the smallest possible space, as a result of which costs for the milking parlor arrangement and also for the associated building can be kept low. On the other hand, the paths for the milking staff and the animals remain shorter, i.e. time saving.

A further advantage of said compact design, is that the divider is able to be fitted in retro into existing systems without losing milking parlors/milking places.

Staff can intervene in the milking operation at all times and without being obstructed by devices, i.e. the supporting arm device and accessories, and have easy access. Additional protection devices are not necessary. When the milking parlor arrangement is a rotary milking parlor, it can maintain its rotation without interruption as the milking staff are able to intervene everywhere, for example, from the outside. There is a considerable reduction in the risk the milking staff may be under.

In one realization, in a fully automatic mode, the arm device is adjustable from the park position in the operating position into an attachment position for automatically attaching the milking cluster onto the teats of the animal to be milked, wherein the milking cluster comprises at least one position sensor. In this case, the milking cluster is moved by the arm device under the udder of the animal to be milked, and the teat cups are automatically attached to the teats with the help of the position sensor for teat determining, the arm device and the drive unit. Said operation is also designated as automatic mode.

Each of the teat cups can be positioned individually in this case.

As an alternative to this, it is provided in another realization that in a semi-automatic mode, the arm device is adjustable from the park position into the operating position, wherein the operating position is a fixed preliminary position which is determinable in advance as a result of stop means, wherein the milking cluster is in a position that is favorable to a milker in the preliminary position. In this case, the milking cluster is adjusted, with the help of simple drive means that are provided with adjustable stops, e.g. pneumatic cylinders, into a fixed preliminary position which is within easy reach for the milking staff under the udder of the animal to be milked. The milker, standing behind the animal, can then grip the teat cups simply and easily and attach them to the teats. As soon as the first teat cup is attached to a teat, this is detected for example by means of a pneumatic pressure sensor and the milking cluster is released from the fixed preliminary position into a free horizontal position. In the vertical position, the milking cluster remains in a floating position as in the case of automatic attachment. Thus, it is ensured that, after the attaching operation, the milking cluster follows the movement of the animal to be milked as in the case of automatic attachment.

Said preliminary positioning of the milking cluster with the arm device in the case of said so-called semi-automatic milking is developed such that the milker only has to move the teat cups a very little to attach them to the teats and has to exert as good as no force. This saves energy and time. As in said realization neither a position sensor nor a drive device is necessary to actuate all the teat positions, but only one simple drive, said realization can be advantageously cost-efficient. A further advantage, in this case, is that said semi-automatic realization can be upgraded to automatic realization. This is possible on account of a multitude of identical parts.

A milking parlor arrangement for milking milk-producing animals can be provided with the above-described divider.

The milking parlor arrangement can be a rotary milking parlor. The rotary milking parlor can be an exterior rotary milking parlor.

A milking parlor arrangement can be realized as a side-by-side, steep or normal herringbone milking parlor arrangement. In this case, in one realization, at least one divider from a plurality of dividers is adjustable in its longitudinal direction from a milking position into an entry position and back again, one end of the at least one divider, which points to a pit partition of a pit for milkers, is arranged closer to the pit partition in the milking position than in the entry position, and between said end in the entry position and the pit partition a space is formed for an entry for the animals to be milked in an entry direction. As a result, it is possible for all the milking parlors to be occupied one after another by animals to be milked without milking parlors remaining empty. The space for the entry prevents the animals coming into contact with the pit separation or with the ends.

In an alternative realization of a side-by-side, steep or normal herringbone milking parlor arrangement, a number of dividers are adjustable in their respective longitudinal direction from a milking position into an entry position and back again, ends of the number of dividers, which point to a pit partition of a pit for milkers, being arranged closer to the pit partition in the milking position than in the entry position, and between said ends in the entry position and the pit partition a space is formed for an entry for animals to be milked in an entry direction.

In a further realization, it is provided that the number of dividers are adjustable separately, in groups or all together in their respective longitudinal direction from a milking position into an entry position and back again. Consequently, it is possible to control animal traffic in a simple and effective manner.

In another realization, the dividers are realized such that in the entry position, they do not release a part region of the assigned milking parlor for the respective animal to be milked until all the animals to be milked have entered the milking parlors of the milking parlor arrangement, and then they release the assigned milking parlor fully. In this connection, the animal traffic can be easily influenced.

In this case, run-through detection is also possible if the milking parlor arrangement comprises a run-through detection system for the animals to be milked which is arranged in the dividers. Thus, the animal traffic can not only be controlled but also monitored in a simple manner.

In summary, the arm device according to the invention, also together with the divider according to the invention and the milking parlor according to the invention, provides the following advantages:

Very low tolerances, even after a long service life.
No element elasticities, in particular when a cow moves with the teat cups attached.
The arm device only exerts a small amount of kinetic energy in x-y planes as no heavy motors and/or transmissions are installed in the arm joint and in the holder joint.
As a result of the small amount of kinetic energy, man/milker and robot are able to work at the same time on the animal to be milked (cow) during a milking operation. No protected space is necessary.
Almost no creeping of the tensile means/transmission elements (this is in particular for ease of operation, manually attaching the teat cups, tracking a moving animal), creeping to be understood as deforming of the material of the transmission means, e.g. by mechanical actions such as kneading, pressing or pulling.
Insensitivity to temperature oscillations.
Only small additional moving masses in TCP (tool center point) (in particular when using plastic deflection rollers), better and quicker adjustability being produced as a result.
Spring steel band is not a wear part.
There is no polygonal effect (such as in the case of connecting rods, chains, toothed belts), better and quicker adjustability being produced as a result.
No great prestressing forces necessary, less forces on bearing points as a result.
Weight saving as a result of using plastics material as the material for many parts (wheels and rollers).
Substantially freedom from play, simple restorability of the milking cluster when scraping/removing/falling down.
Reduced risk of injury to the animals to be milked.

Advantageous further developments and designs of the milking cluster or of the milking parlor are the object of the respective dependent claims.

Further advantages and details proceed from the exemplary embodiment shown in the figures of the drawing, in which:

BRIEF DESCRIPTION OF THE DRAWINGS

FIGS. 2-2a show schematic views of a second exemplary embodiment of the milking parlor arrangement according to the invention having the dividers according to the invention;

FIG. 2b shows a schematic top view of a variant of the second exemplary embodiment according to FIGS. 2-2a;

FIG. 3 shows schematic top view of a third exemplary embodiment of the milking parlor arrangement according to the invention having the dividers according to the invention;

DETAILED DESCRIPTION OF THE DRAWINGS

Identical or similar functional components are provided with the same reference symbols in the figures. A vertical direction z is specified in some figures, coordinates x, y being provided for different planes.

Directional specifications such as, for example, "up", "down", "left", "right" etc. refer to the representations of the respective figure.

Figure 1:
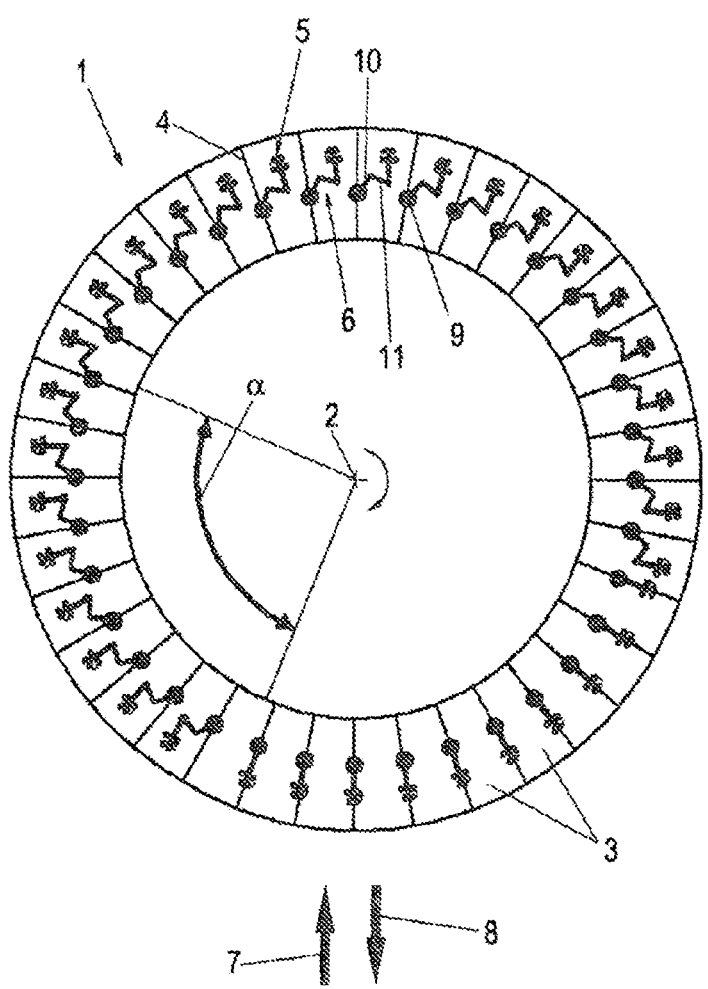
FIG. 1 shows a schematic top view of an exemplary embodiment of a milking parlor arrangement according to the invention having dividers according to the invention with arm devices according to the invention.
Figure 1A:
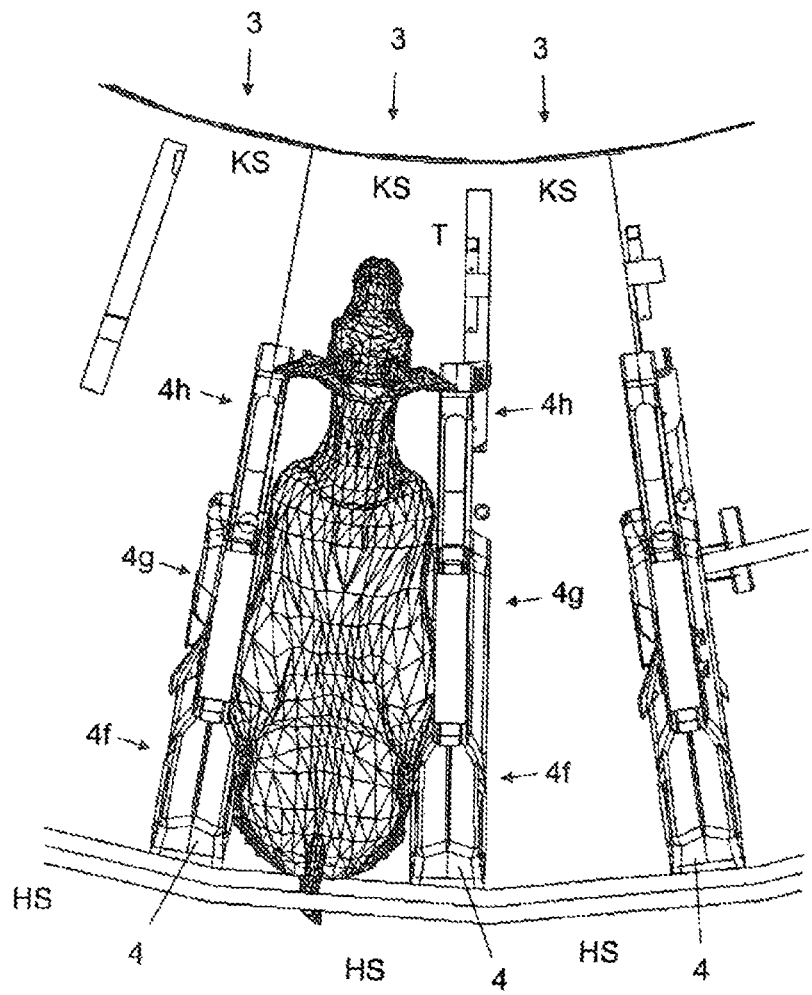
FIG. 1a shows a schematic top view of milking parlors according to FIG. 1.

FIG. 1 shows a schematic top view of a first exemplary embodiment of a milking parlor arrangement 1 having dividers 4 according to the invention with arm devices 6 according to the invention. FIG. 1a shows a schematic top view of milking parlors according to FIG. 1.

The milking parlor arrangement 1 is designed in the manner of a so-called external rotary milking parlor. In this case, the animals to be milked stand with their heads facing to the center, i.e. aligned with respect to a pivot point 2. The rotary milking parlor is rotatable clockwise here about the pivot point 2. In said example, thirty-six milking parlors 3 are arranged on the circumference of the rotary milking parlor and are separated by dividers 4. The dividers 4 are also designated, for example, as side rails and are aligned approximately parallel to the longitudinal axis of an animal to be milked. The milking parlor arrangement 1 is used for the mechanical milking of milk-producing animals, e.g. cows, by means of milking clusters 5. In each case a milking cluster 5, which is adjustable by means of an arm device 6 from a park position into an operating position under the udder of an animal to be milked, e.g. a cow, in a milking parlor 3, is provided for each milking parlor 3. Each milking cluster 5 is arranged inside a divider 4. The positions will be explained in more detail below.

A milking parlor 3 comprises in general two longitudinal sides and two narrow sides. The longitudinal sides and the narrow sides can be arranged (in part) at right angles to one another (see, for example, FIGS. 2, 2a, 3) or at angles not equal to 90° (see, for example, FIG. 1a). The animal T to be milked stands between the longitudinal sides, its head points to the narrow side, called the head side KS, the other narrow side being assigned to the hindquarters of the animal T to be milked and being designated as the hindquarter side HS.

The divider 4 is arranged on at least one of the longitudinal sides and forms a lateral boundary of the milking parlor 3.

In the case of a milking parlor arrangement 1'; 1" with right-angled milking parlors 3 arranged side by side, as is the case, for example, in a side-by-side arrangement (see FIGS. 2, 2a, 3), the divider 4 is arranged parallel to an imaginary longitudinal axis of the animal T to be milked. In this case, it is assumed for the purposes of simplification that the animal T to be milked stands still with its imaginary longitudinal axis in an ideal state during the milking operation.

In the case of a milking parlor arrangement 1 with milking parlors arranged in a circular manner, as in the case of a rotary milking parlor, the longitudinal sides of the milking parlors 3 are not parallel. In said case, the longitudinal sides are segments of radii of a circle of the rotary milking parlor and intersect in imaginary extension at the center point of said circle or at the pivot point 2 of the rotary milking parlor, thereby forming a center point angle. The imaginary longitudinal axis of the animal to be milked also runs in the ideal case through the pivot point and halves the center point angle. This case is abbreviated here by the term "approximately parallel" in the rest of the document.

The rotary milking parlor in FIG. 1 can be entered by the animals by means of an entry 7 and left again by means of an exit 8. Once an animal has entered a milking parlor 3, it is important that the animal takes up a predefined position. This is achieved by the dividers 4 forming a delimited milking parlor 3. Thus, the longitudinal sides of the milking parlors 3 are formed by the dividers 4. The milking parlors 3 each comprise the narrow sides KS and HS which are each arranged between the front and rear ends of the longitudinal sides. The dividers 4, in spite of their compact dimensions, contain all components for pre-dipping, teat cleaning, attaching the milking cluster 5, milking, removing the milking cluster 5 and post-dipping. Each divider 4 can be divided into three portions in its longitudinal axis, namely into a hindquarter portion 4f, a center portion 4g and a head portion 4h. Said portions 4f, 4g, 4h are thus assigned substantially to the portions of the animal T to be milked.

Figure 4:
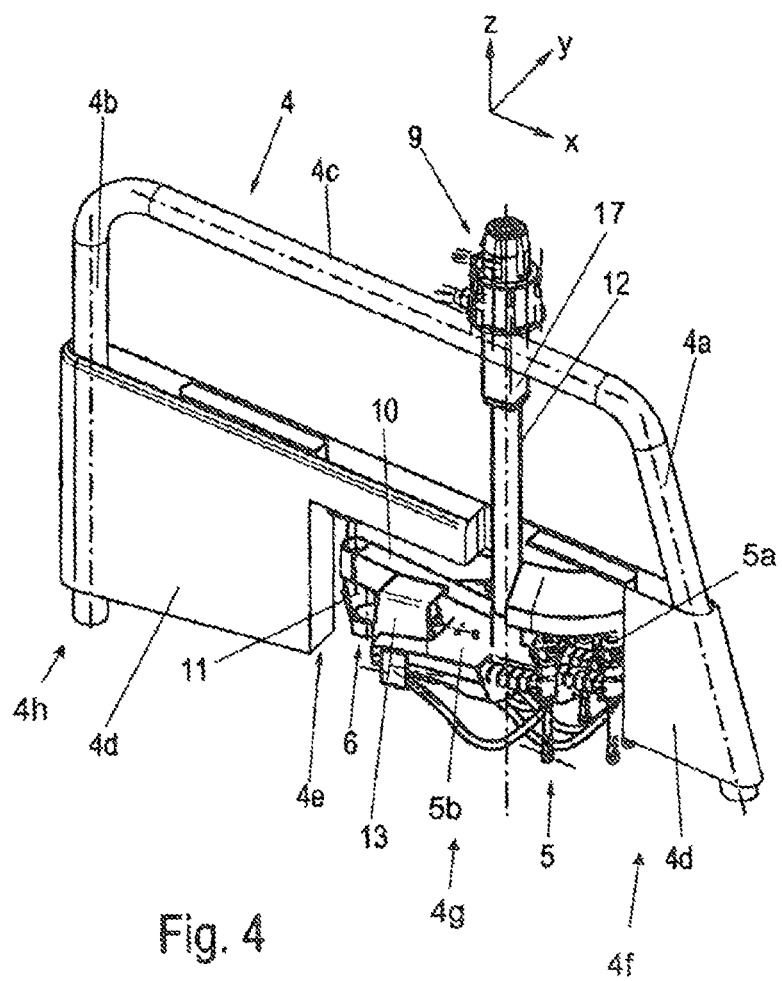
FIG. 4 shows a schematic view in perspective of the divider according to the invention with the arm device according to the invention in a park position.
Figure 5:
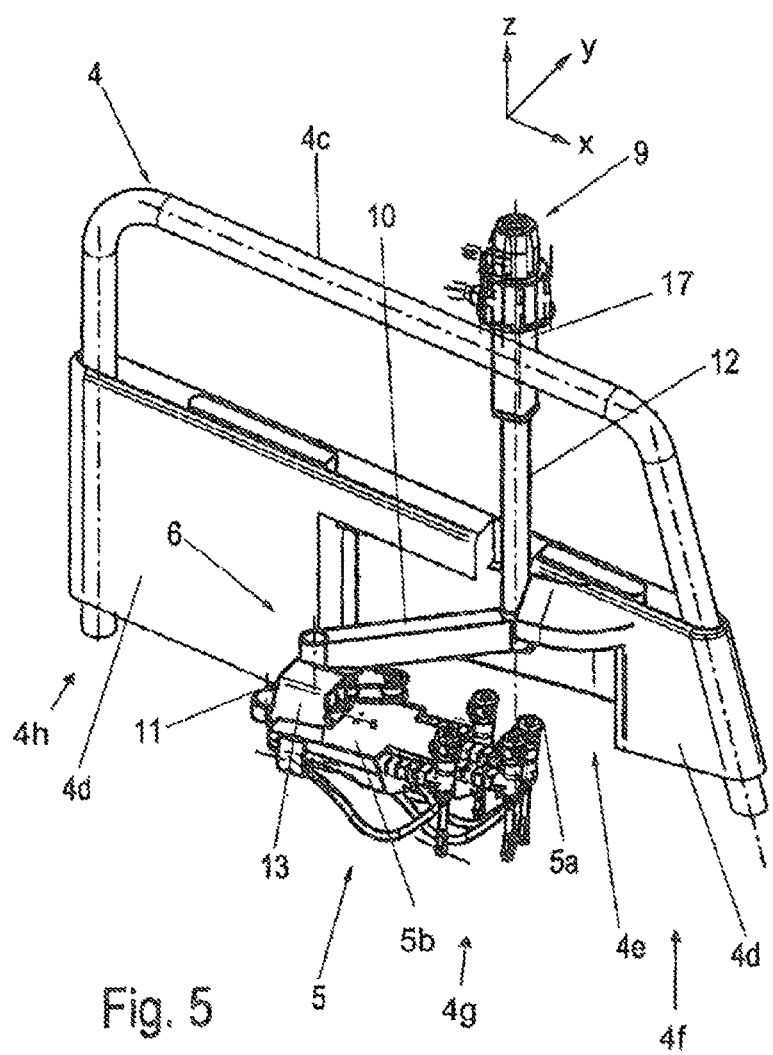
FIG. 5 shows the perspective view according to FIG. 4 with the arm device according to the invention in an operating position.

When the animal T stands in the milking parlor 3, in a preferred manner inside a segment of a circle, which is designated here as attachment region a, the milking cluster 5 is adjusted from the park position in the divider 4 into the operating position from the side of the animal between its front legs and hind legs under the udder of the animal and is attached to said udder with the help of a position sensor 13 (see, for example, FIGS. 4, 5). However, attachment can be effected, in principle, from any position of the rotary milking parlor, for example if a milking cluster 5 has fallen off again. In the first exemplary embodiment, a drive unit 9, which will be explained in more detail below and which is connected to the arm device 6, is arranged on each divider 4. Once the milking operation has been completed, the milking cluster 5 is removed again from the animal to be milked by means of the arm device 6 and drive unit 9 or it falls off automatically into a waiting position or end-of-milking position and is then adjusted into the park position.

All the milking parlors 3 are freely accessible at the outside circumference of the milking parlor arrangement 1 by a milker such that he is able to intervene in a milking operation at all times. Said operating area is consequently kept free of additional devices. Any risk to the milker is minimized. The rotary milking parlor can remain constantly in rotation; even the inside area of such a milking arrangement/milking system is accessible to a supervisor at any time without any risk to said person.

The arm device 6 comprises an arm 10 and a holder 11 and has the job of carrying the milking cluster 5 in a weight-neutral manner and thus being easy to operate such that it follows the movements of the animal to be milked.

The arm device 6 will be described in more detail below.

FIGS. 2 and 2a show schematic views of a second exemplary embodiment of the milking parlor arrangement 1' according to the invention with the dividers 4 according to the invention. FIG. 2 shows a front view and FIG. 2a a top view. The milking parlors 3 are arranged side by side here and are also separated by dividers 4. Animals T to be milked, which here are cows, are situated in the milking parlors 3. A drive unit 9 in each case for an arm device 6 with the milking cluster 5 is arranged on each divider 4.

Figure 2B:
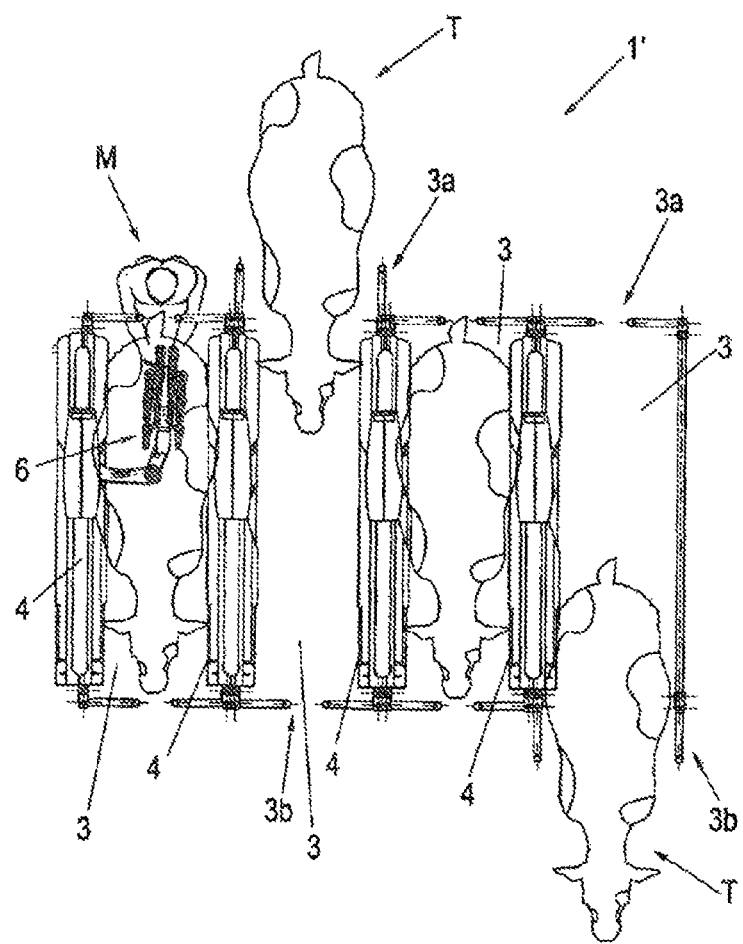

FIG. 2b shows a schematic top view of a variant of a second exemplary embodiment according to FIGS. 2-2a. Said variant is also designated as a drive-through milking parlor arrangement 1'. The milking parlors 3 are laterally separated by the dividers 4. Gates 3a, 3b are arranged in each case at the narrow rear sides and front sides of the milking parlors 3, the gates 3a being opened at the rear sides in order to form an entry for an animal T into the milking parlor 3 (second milking parlor 3 from the left in FIG. 2b). The animal T cannot escape at the front side as these are closed by the gates 3b. If an animal T is situated fully in the milking parlor 3, the gates 3a of the rear side are closed (first and third milking parlor 3 from the left in FIG. 2b). Once the milking operation has been completed, the gates 3b of the front side are opened and the animals T can leave the milking parlor 3 again, as is shown in the case of the fourth milking parlor 3 from the left in FIG. 2b.

FIG. 3 shows a schematic top view of a third exemplary embodiment of the milking parlor arrangement 1" according to the invention with dividers 4 according to the invention. In said third exemplary embodiment, the dividers 4 are pivotably arranged in a U-shaped gangway, wherein they initially form a path by being pivoted in a line and guiding the animals T. The right-hand gangway in FIG. 3 is described below. This also refers to the left-hand gangway in the manner of a mirror image. As soon as the first animal has arrived at the end of the U-shaped gangway, the first divider 4 at the end pivots such that a milking parlor 3 is formed. The pivoting can be effected either in a controlled manner by means of a rotatory actuator or automatically as a result of the movement of the animal T. Said operations run until all the animals are positioned in the milking parlor arrangement 1". Here too, a drive unit 9 in each case for an arm device 6 with the milking cluster 5 is arranged on each divider 4. It is also possible to dock (which will be explained in more detail below) drive units 9' which are moved by means of a top or bottom rail.

Two U-shaped gangways are arranged in this case in a mirror-symmetrical manner and are separated by a so-called pit G. The pit G is the communal area of a milker who is able to monitor the milking on both sides and intervene to help from here without being obstructed by the movement of the arm devices 6.

Figure 3A:
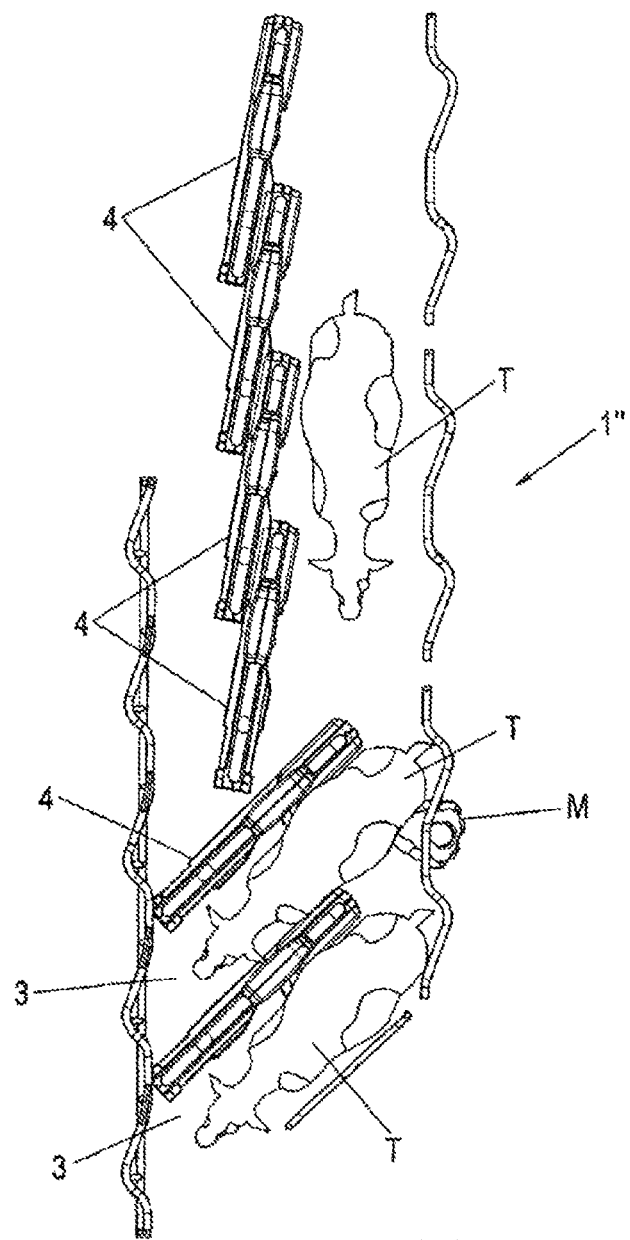
FIG. 3a shows a schematic top view of a variant of the third exemplary embodiment according to FIG. 3.

A type of herringbone design is naturally also possible, the milking parlors 3 being separated by the dividers 4. This is shown in FIG. 3a in a schematic top view of a variant of the third exemplary embodiment according to FIG. 3. In FIG. 3, the milking parlors 3 are formed by the dividers 4 which are folded up against one another beforehand such that a path is formed as the entry, the dividers 4 folded up against one another forming a continuous boundary of said entry. When the first animal T reaches the end of the milking parlor arrangement, which end is formed by a boundary which is not shown in any more detail and is at right angles in FIG. 3 and at an angle, of for example 45°, to the longitudinal axis of the entry in FIG. 3a, the first divider 4 is rotated clockwise until it runs parallel to said boundary and together with said boundary forms the first milking parlor 3. In this way, all the milking parlors are formed one after the other as a result of the corresponding pivoting of the dividers 4. As a result of the angled position of the animals T, i.e. their imaginary longitudinal axes run at an angle to the longitudinal axis of the entry, the rear regions of the animals T are free for a milker M to access from the side. In FIG. 3a this is the left-hand side of an animal T in each case.

It is also possible in the case of the milking parlor arrangements 1' according to FIGS. 3 and 3a that the dividers 4 are not folded up against one another, but are arranged so as to be displaceable in their longitudinal axes. Reference is made to document WO 2013/135248 A1 for a detailed description. The dividers are already set up beforehand in the arrangement parallel to the boundary (right-angled or angled) outside the region of the animals T. As soon as the first animal T is set up with its imaginary longitudinal axis next to the boundary, the first divider 4 is slid in the direction of its longitudinal axis into the region of the animals T such that it stands on the other side of the animal T and forms the milking parlor 3. When the thus formed milking parlors 3 are to be vacated, the boundary is opened (pivoted or also displaced in the direction of its longitudinal axis), and the first animal T is able to leave the milking parlor 3. The first divider 4 is then slid back again in the direction of its longitudinal axis into its initial position, etc.

Figure 3B:
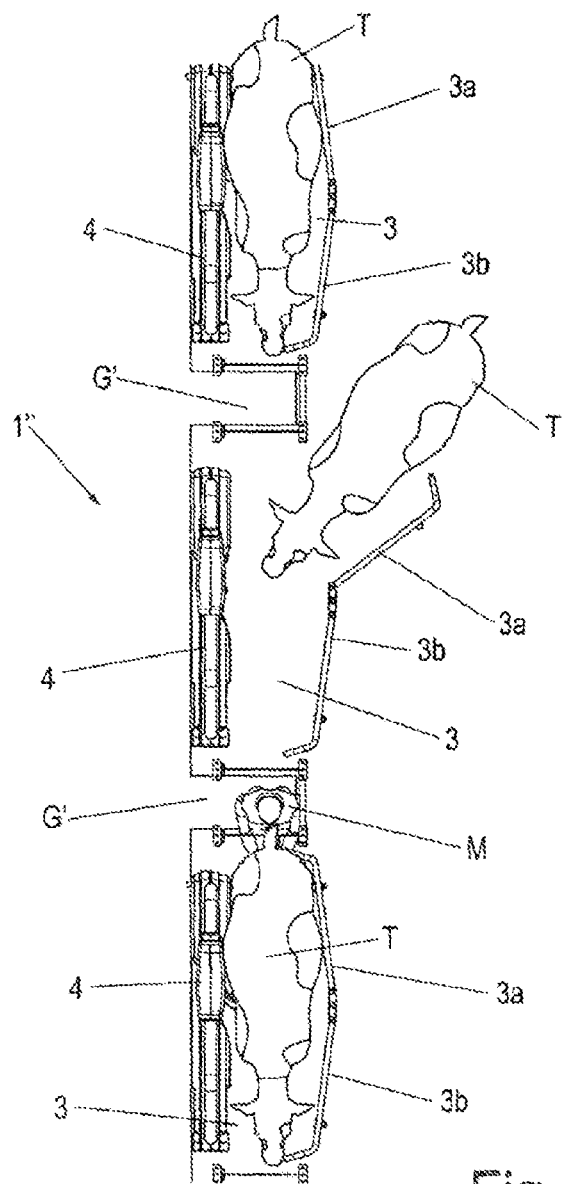
FIG. 3b shows a schematic top view of a further variant of the third exemplary embodiment according to FIG. 3.

FIG. 3b shows a schematic top view of a further variant of the third exemplary embodiment according to FIG. 3. Said milking parlor arrangement 1" is also designated as a tandem arrangement. The milking parlors 3 are arranged one behind another or in rows in this case, their narrow sides being spaced apart by the pit G' for the milker M and comprising in each case boundaries, e.g. rails. The longitudinal sides of the milking parlors 3 are formed on the one hand in each case by a divider 4 and by a two-part boundary which is realized as gates 3a, 3b. The gate 3a of the central milking parlor 3 is pivoted up in order to allow an animal T into the milking parlor 3, the gate 3b being closed. Both gates 3a, 3b are closed during the milking operation. After the milking, the gate 3b pointing to the head of the animal T is opened and the animal T is able to leave the milking parlor 3.

FIG. 4 shows a schematic view in perspective of the divider 4 according to the invention with the arm device 6 according to the invention in the park position. FIG. 5 shows a schematic view in perspective of the divider 4 according to the invention with the arm device 6 according to the invention in an operating position.

The divider 4 is realized here as a housing in which the entire actuator technology for the arm device 6 and the milking cluster 5, as well as control elements and drive units are arranged. The divider 4 is thus a complete unit which is pre-mountable at a given position and is completely replaceable or retro-fittable.

The divider 4 is here as a tubular construction with a front post 4a, which is at a slight angle, and a rear post 4b. The posts 4a, 4b are connected by means of a horizontally extending horizontal rod 4c. Approximately from halfway up, the posts 4a, 4b are encased in a cladding 4d which extends approximately as far as to the feet of the posts 4a, 4b. The posts 4a, 4b and the horizontal rod 4c can also be produced in one piece from bent tubing. There is an opening 4e in the front half of the cladding 4d, as a result of which a receiving means is produced in the cladding 4d inside the divider 4 which can also be bulged out toward the sides (see for example FIG. 7) such that it receives and surrounds the milking cluster 5 parked therein. An additional protective cover (not shown) can be mounted on the side of the opening 4e to protect the milking cluster 5. Said protective cover can be displaced, for example in the direction of the divider 4, when the milking cluster 5 is activated in order to release the opening 4e. In a further embodiment, the protective cover can be mounted on the milking cluster 5. The protective cover thus remains fixed to the milking cluster 5 and also moves with it. It can also be reduced in size in the operating position, for example by automatically folding up or telescoping.

In said exemplary embodiment, the milking cluster 5 comprises four teat cups 5a and is mounted with a milking cluster carrier 5b on the holder 11 of the arm device 6. Each of the four teat cups 5a can assume a different position and be automatically fixed and switched in a freely movable manner independently of the others. Consequently, the teat cups 5a can assume individual positions in the attached state as the teat cups 5a are attached individually. In addition, an individual teat cup pre-positioning means (not shown) is also conceivable, by way of which several teat cups are then attached at the same time.

The milking cluster 5 is additionally provided with a position sensor 13 which is realized here as a three-dimensional optical sensor. By way of the position sensor 13, the milking cluster 5 is adjusted from the park position into the operating position according to FIG. 5 by means of the arm device 6 and a drive unit 9.

The arm device 6 can be folded up together with the milking cluster 5 in a scissor-shaped manner in a respective x-y plane, as a result of which the width of the milking cluster 5 in the bottom folded-in region in the park position when the milking cluster 5 is in a so-called cleaning-in-place (CIP) position, is not significantly exceeded. The teat cups 5a are cleaned in the cleaning-in-place (CIP) position. Further details in this respect can be found in document WO 2013/135842 A1.

The milking cluster 5 is able to assume various positions in the operating position. An attachment position serves, for example, for positioning the teat cups 5a such that they can be suspended in each case onto a corresponding teat of an animal to be milked.

During the milking operation, the arm device 6 supports the milking cluster 5 in such a manner that the weight of the milking cluster 5 does not impair the milking operation. After completed milking, the teat cups 5a are released again from the udder of the milked animal.

The drive unit 9 serves for generating rotations or pivoting movements which are transmitted in a suitable manner to the arm device 6. Such a transmission of rotation or torque from motors or drives of the drive unit 9 is effected, for example, using transmissions by means of toothed belts or/and rods, tensile means, etc.

Control of the movement processes of the arm device 6 and of the milking cluster 5 is effected by means of a control device which is not shown here. The control device is connected to the position sensor 13 and the drive unit 9. In said exemplary embodiment, the drive unit 9 is mounted on a top end of an arm drive shaft 12. The arm drive shaft 12 and with it the drive unit 9 and the arm device 6 with the milking cluster 5 are fastened in a bearing unit 17 on the horizontal rod 4c of the divider 4 and are guided so as to be adjustable both rotationally and vertically (in the z direction). The arm drive shaft 12 is fixedly connected by way of its other end to an end of the arm 10 of the arm device 6. At its top end, the arm shaft 12 is coupled with a drive of the drive unit 9. A further shaft for driving the holder 11, which shaft is drivable by a further drive of the drive unit 9, is arranged in the arm shaft 12 which is realized as a hollow shaft. This will be explained in more detail below. The arm drive shaft 12 and the arm device 6, connected to it, with milking cluster 5 are adjustable by means of a vertical drive 16 (see FIG. 6), for example a pneumatic cylinder, in the vertical direction z. Adjustment of the milking cluster 5 out of the park position into the operating position or other positions is effected as a result of combined movement sequences both in the vertical direction z and also in a respective x-y plane.

The drives of the drive unit 9 can be realized in different realizations such as, for example, servomotors with corresponding transmissions, but direct drive motors are also possible. In addition, they are realized, for example, as so-called torque motors, as a result of which a certain elasticity of the arm device 6 and of the milking cluster 5 is achieved. For example, kicks from the animal to be milked can be cushioned.

In this way, both the arm 10 and the holder 11 are drivable in a targeted manner independently of one another.

The drive unit 9 is arranged here in the top region of the divider 4 above an animal to be milked outside the range of the same. The advantage of this, on the one hand, is that the drive unit 9 is located in an area that is not within kicking range. In addition, the top region above the animal is better protected from moisture and the damage connected thereto. In addition, the particularly narrow design of the divider 4 is also possible as a result. The arm device 6 with the milking cluster 5 is arranged in the bottom region of the divider 4 such that necessary pivoting of the arm device 6 with the milking cluster 5 underneath the stomach of an animal to be milked is able to take place from the side. In this case, the legs of the animal to be milked are not in the way.

In the park position of the milking cluster 5 and of the arm device 6 inside the cladding 4d of the divider 4, the milking cluster 5 can be moved under a cleaning device which is described in document WO 2013/135842 A1. Reference is also made to said document with regard to a description of a milk start.

Figure 6:
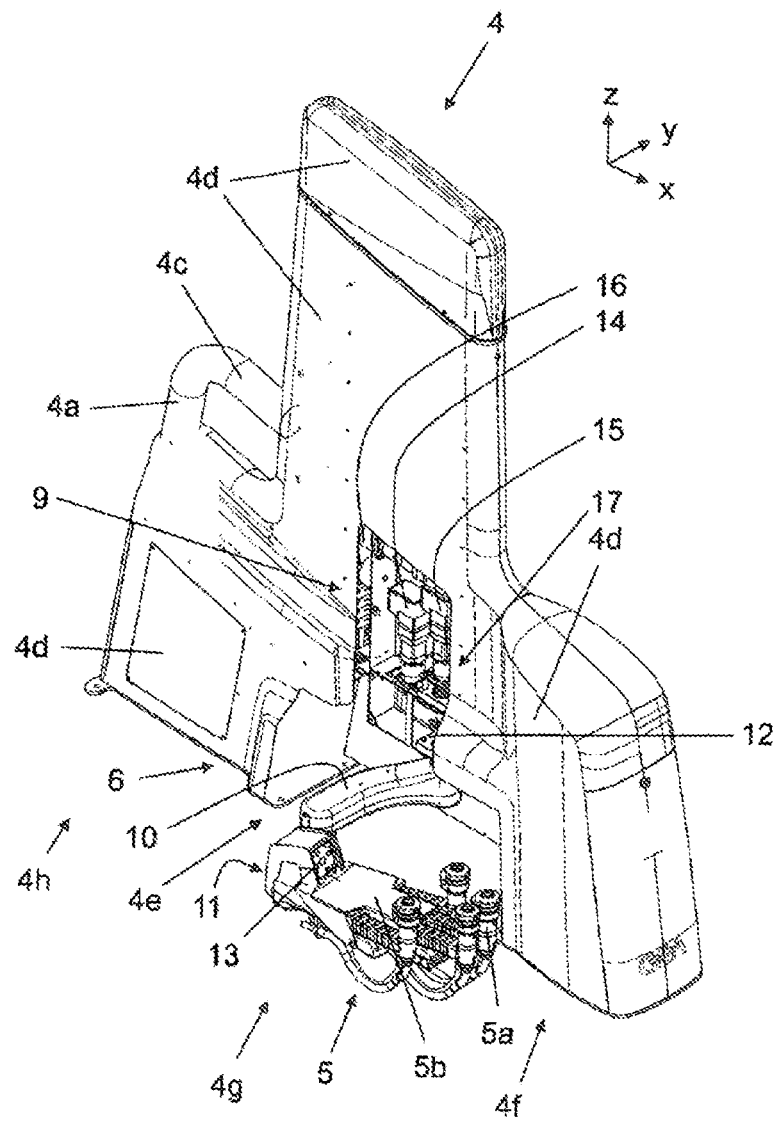
FIG. 6 shows a perspective view of a variant of the divider according to the invention with the arm device according to the invention in an operating position.
Figure 7:
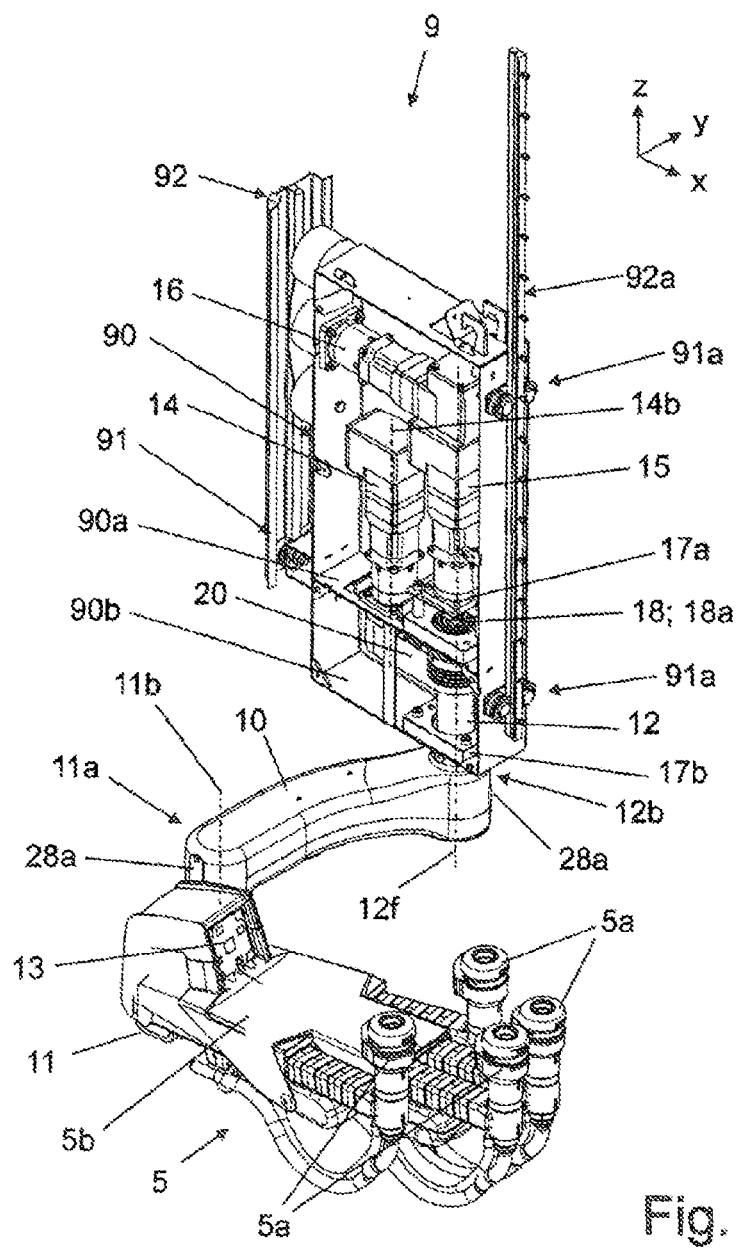
FIG. 7 shows an enlarged view of the arm device according to the invention according to FIG. 6 in an operating position.
Figure 8:
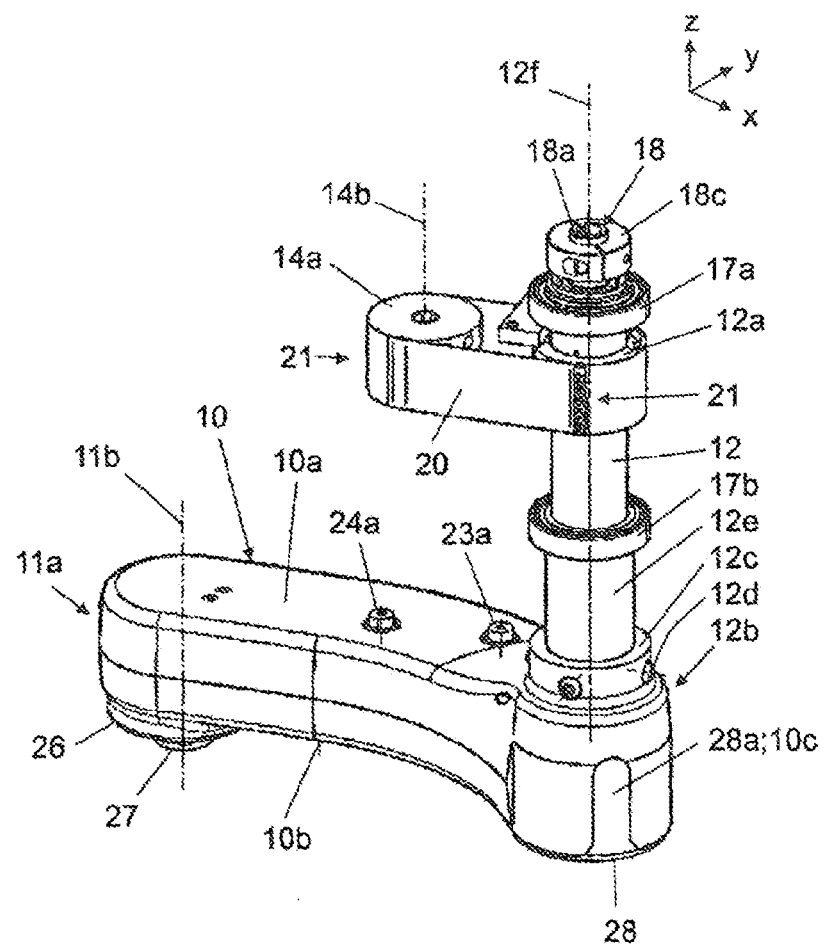
FIG. 8 shows a perspective part view of the arm device according to the invention according to FIG. 6.

FIG. 6 is a view in perspective of a variant of the divider 4 according to the invention with the arm device 6 according to the invention in an operating position. To this end, FIG. 7 shows an enlarged view of the arm device 6 according to the invention according to FIG. 6 also in an operating position. FIG. 8 shows a perspective part view of the arm device 6 according to the invention according to FIG. 6.

In said variant, the cladding 4d of the divider 4 includes two self-supporting half shells. In this case, said half shells are divided into portions 4f, 4g and 4h. The assignment of the portions 4f, 4g and 4h to the side of the animal T to be milked has already been explained above in conjunction with FIG. 1a. The portion 4f is assigned to the hindquarters of an animal T to be milked and is named as the hindquarter portion 4f. It includes a receiving space for a service unit that is not described in any more detail. Reference is made to WO 2013/135842 A1 for further information in this respect.

A center portion 4g, which comprises the receiving means 4e for the milking cluster 5 with the arm device and the associated drives of the drive unit 9, connects to the hindquarter portion 4f. The center portion 4g is assigned to the center of the animal T to be milked. The drive unit 9 is explained in detail again below.

The head portion 4h is assigned to the head of the animal T to be milked and is connected to the post 4a which is bent rearward in a radius on its surface and merges into the horizontal rod 4c which here is angled downward to the rear. The horizontal rod 4c extends up to a front-end face of the center portion 4g which extends upward here and is connected to the horizontal rod 4c. The inclination of the horizontal rod 4c rearward continues in an inclination of the top surface of the hindquarter portion 4f.

The drive unit 9 comprises an arm drive 14 for pivoting the arm 10, a holder drive 15 for pivoting the holder 11 with the milking cluster 5 and a vertical drive 16 for adjusting the arm device 6 in the vertical direction z. The arm drive 14 and the holder drive 15 are mounted in a frame 90 which is adjustable in the vertical direction z and can be adjusted by means of a vertical drive 16. The frame 90 is guided on both longitudinal sides with vertical guide bearings 91, 91a in each case on a vertical guiding element 92, 92a, for example a suitable profiled strip, so as to be displaceable in the vertical direction z. The vertical guide bearings 91, 91a and the vertical guide elements 92, 92a are not described in any more detail, but can be seen clearly in FIG. 7.

In this case, the arm drive 14 and the holder drive 15 are fastened next to one another in the frame 90 on a support element 90a. The holder drive 15 is mounted here on a first bearing 17a of the bearing unit 17, a second bearing 17b of the bearing unit 17 being mounted below this on a further support element 90b of the frame 90. The support elements 90a and 90b run in the longitudinal direction of the divider 4 and are arranged parallel to one another at a spacing in the vertical direction z. In said realization, the second support element 90b is part of the frame 90.

The arm drive shaft 12 is mounted in the first bearing 17a and the second bearing 17b of the bearing unit 17 so as to be rotatable about the vertical direction z and extends in the vertical direction z. Beneath the top support element 90a, the arm drive shaft 12 is coupled with an output of the arm drive 14 by means of a transmission element 20, which will be described in more detail below. The bottom end of the arm drive shaft 12 is connected to an end of the arm 10. This will also be explained in more detail below. The arm drive 14 is adjustable in the longitudinal direction of the support element 90a by means of a stressing device (not designated in any more detail) for stressing the transmission element 20.

Inside the arm drive shaft 12, which is realized as a hollow shaft, a holder drive shaft 18 (see also FIG. 8) is arranged so as to be rotatable about the vertical direction z, the holder drive shaft 18 being rotatable independently of the arm drive shaft 12. The holder drive shaft 18 is coupled with an output of the holder drive 15 above the first bearing 17a.

The arm 10 will be described in more detail below. In the operating position shown in FIG. 7, it extends from its end, which is located on the right in the figure, is designated as an arm joint 12b and is connected to the bottom end of the arm drive shaft 12, to the left in an x-y plane (in the case of the milking parlor 3 to the head side KS thereof (FIG. 1a)). The left-hand end of the arm 10 is designated as a holder joint 11a, about which the holder 11 is pivotable with the milking cluster 5 about the vertical direction z. A mounting opening cover 28a, which will be described in more detail below, is provided in each case on both ends of the arm 10, only the one on the right-hand end of the arm 10 being able to be seen here.

The drives 14 and 15 are not shown in FIG. 8 for the purposes of clarity, they are however easily imaginable in conjunction with FIGS. 6 and 7.

The arm drive shaft 12 and the holder drive shaft 18 are both arranged concentrically with respect to an arm axis 12f which runs in the vertical direction z here.

The top end of the arm drive shaft 12 is rotatably mounted in the first bearing 17a, which can be seen well in FIG. 8. A top end of the holder drive shaft is designated as a drive end 18a and is provided with a holder coupling 18c which is not explained in any more detail and to which the output of the holder drive 15 is couplable (see FIG. 7).

The coupling of the transmission element 20 with the arm drive shaft 12 is effected by means of an arm drive wheel 12a which is mounted non-rotatably on the arm drive shaft 12. In addition, the transmission element 20 is coupled with the output of the arm drive 14 by means of an arm output wheel 14a. The arm output wheel 14a is rotatable about an arm output axis 14b which runs parallel to the arm axis 12f in the vertical direction z.

The transmission element 20 here is a tensile means produced from a metal band. It is coupled with the arm output wheel 14a and the arm drive wheel 12a in each case by means of a fastening device 21. The fastening device 21 will be explained in more detail below. The transmission element 20 wraps in each case the arm output wheel 14a and the arm drive wheel 12a in an angle of wrap of 180° and comprises a width, i.e. an extension in the vertical direction z. Said width corresponds approximately to an outside diameter of the arm output wheel 14a.

The arm drive shaft 12 is mounted approximately in its center in the second bearing 17b and extends further downward through a sleeve 12e into a type of ring which forms an arm fastening 12e which is fixedly connected to the right-hand end of the arm 10. The bottom end of the arm drive shaft 12 is received in the arm fastening 12e and is fastened here to the circumference by means of four fastening elements 12d. In this way, the arm 10 is pivotable about the arm axis 12f by means of the arm drive shaft 12.

The arm 10 comprises a type of banana shape. It includes a housing 10a which is closed on the bottom surface by a cover or a housing bottom part 10b. The holder joint 11a, which will be explained in more detail below in conjunction with FIG. 8, is arranged on the left-hand end of the arm 10. The holder joint 11a is closed from below by a holding plate 26, by means of which a holder shaft 27, which is connectable to the holder 11, extends out and down.

A type of elongated hole, which forms a mounting opening 10c (can be seen best in FIG. 13) and extends in the vertical direction z, is situated in the wall of the housing 10a on the right-hand end of the arm 10, which forms the arm joint 12b. Said mounting opening 10c is closed here by the mounting opening cover 28a of a cover 28. The cover 28 closes the arm joint 12b from below. Such a mounting opening 10c is also provided on the other end of the arm 10 in the region of the holder joint 11a. The function of the mounting opening 10c will be explained again below.

A fastening element 23a and an adjusting element 24a, which project out of the housing 10a or are reachable through the wall of the housing 10a on the top surface, are provided on the top surface of the housing 10a of the arm 10. Their function will be described in conjunction with FIG. 9.

Figure 9:
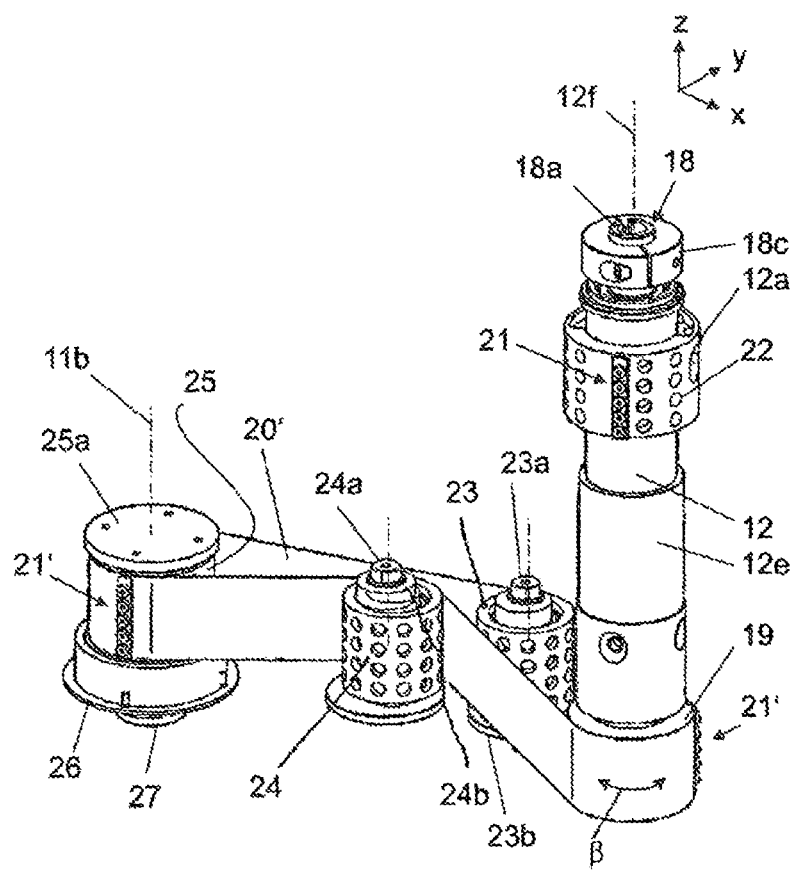
FIG. 9 shows a perspective part view of functional components of the arm device according to the invention according to FIG. 8.
Figure 10:
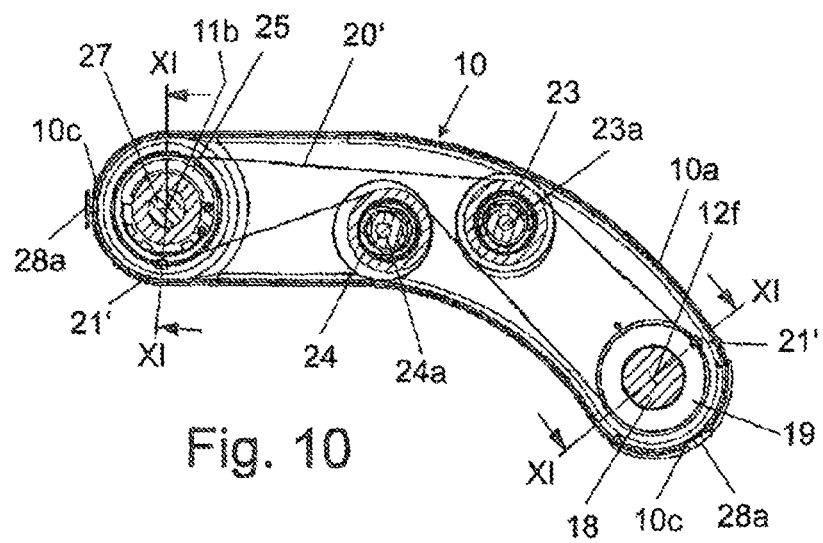
FIG. 10 shows a sectional view of an arm of the arm device according to the invention in an x-y plane from FIG. 8.

FIG. 9 shows a perspective part view of functional components of the arm device 6 according to the invention according to FIG. 8. FIG. 10 shows a sectional view of the arm 10 of the arm device 6 according to the invention in an x-y plane from FIG. 8.

The transmission element 20 with the arm output wheel 14a has been removed here. In addition, the arm 10 with its housing 10a is not shown, as a result of which the functional elements inside the arm 10 are able to be seen.

A bottom end of the holder drive shaft 18 (output end 18b in FIG. 13), on which a holder output wheel 19 is mounted in a non-rotatable manner, protrudes from the bottom end of the arm drive shaft 12. A further transmission element 20', which is also a tensile means produced from a metal band just as the transmission element 20, wraps around the holder output wheel 19 at an angle of approximately 180° and is fixedly connected to said holder output wheel 19 by means of a fastening device 21'.

In its further development, the transmission element 20' stands inside the housing 10a of the arm 10 (not shown here) adapted to its form, in contact with a guide roller 23 and a pressing roller 24 and on the left-hand side, which corresponds to the holder joint 11a of the arm 10, wraps around a holder drive wheel 25 at an angle of wrap of more than 180°. The transmission element 20' is fastened on the holder drive wheel 25 also with a fastening device 21' as on the holder output wheel 19.

The holder drive wheel 25 is non-rotatably coupled with the holder shaft 27 and is rotatable or pivotable therewith about a holder axis 11b. The holder drive wheel 25 is rotatably mounted with the holder shaft 27 in a bearing arrangement that is not shown, and is connected to the holding plate 26. In addition, a type of cover 25a is provided on the holder drive wheel 25 which forms a further bearing arrangement for the holder shaft 27.

The guide roller 23 is fastened on a plate 23b by means of the fastening element 23a with the bearing arrangement that is not shown, is insertable into the arm 10 from the bottom surface of the housing 10a and is reachable, e.g. fastenable, from the top surface. The pressing roller 24 is installable in a similar manner, the actuating element 24a being realized in an eccentric manner in order to form a possibility for prestressing the transmission element 20' as a result of rotating the actuating element 24a.

It can be seen clearly in FIG. 9 that the arm drive wheel 12a, the guide roller 23 and the pressing roller 24 comprise openings 22 which serve, on the one hand, to save weight and, on the other hand, to prevent contamination of the respective transmission element 20, 20'. Possible dirt is conveyed through the openings toward the inside of the respective wheel or the respective roller and consequently to the outside.

On account of the fastening of the transmission elements 20, 20' by means of the fastening devices 21, 21' on the associated wheels 14a, 12a, 19, 25, pivoting about a pivot angle β of a maximum of 180° is possible, a stop being formed as a result at the same time. The pivot angle β is, for example, within the range of 160° . . . 165°.

FIG. 10 shows a sectional view in an x-y plane of the arrangement of the transmission element 20' with the wheels 19 and 25 as well as the rollers 23 and 24. In addition, the mounting openings 10c on the ends of the housing 10a of the arm 10 with the mounting opening covers 28a can be seen. The guide roller 23 and the pressing roller 24 are arranged offset in the longitudinal direction of the arm 10 such that, in spite of the narrow realization of the housing 10a, enough space is present for both rollers 23 and 24 including a space for stressing the transmission element 20'.

Figures 11, 11A:
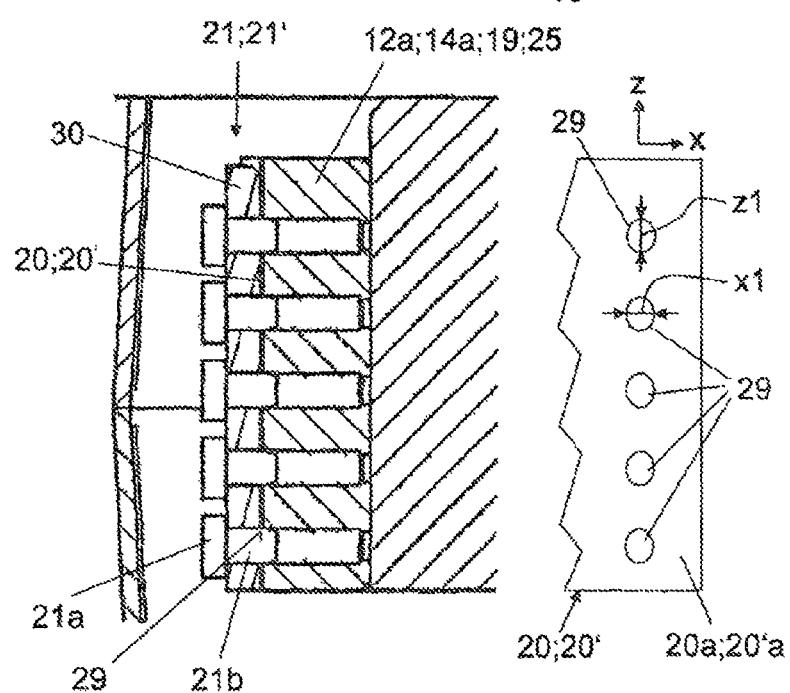
FIG. 11 shows a schematic sectional view in each case along the lines XI-XI from FIG. 10.
FIG. 11a shows a schematic view of a fastening portions of a transmission element.
Figure 12:
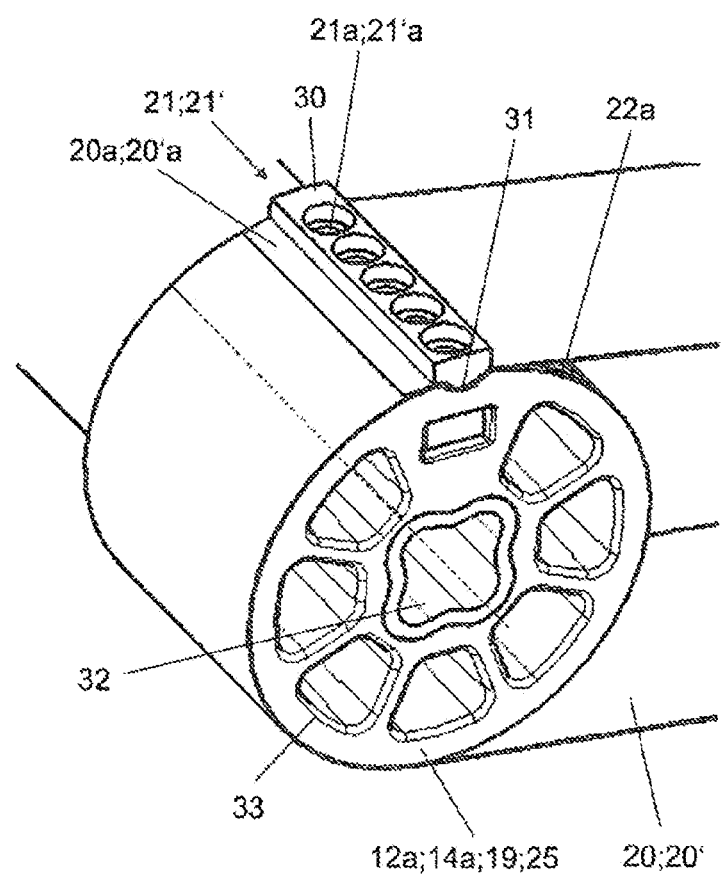
FIG. 12 shows a schematic representation in perspective of a drive/output wheel with a transmission element.

FIG. 11 shows a schematic sectional view by way of the lines of intersection XI-XI from FIG. 10 for further explanation of the fastening devices 21, 21'. FIG. 11a shows a schematic view of a fastening portion 20a, 20'a of a transmission element 20, 20'. FIG. 12 shows a schematic representation in perspective of a drive/output wheel with a transmission element 20, 20'.

The fastening device 21, 21' includes fastening elements 21a, 21'a, for example so-called fitting screws (DIN 609) with thread and centering portions 21b, and at least one sliding block 30. The fastening elements 21a, 21'a are arranged in the vertical direction z parallel to the respective rotational/pivot axis of the associated wheel 12a, 14a, 19, 25 and extend radially with respect to the respective wheel 12a, 14a, 19, 25 from the outside through a sliding block 30 with openings through respective fastening openings 29 of fastening portions 20a, 20'a of the respective transmission element 20, 20' into a threaded hole of the respective wheel 12a, 14a, 19, 25.

In this connection, the fastening openings 29 in the respective fastening portion 20a, 20'a of the associated transmission element 20, 20' are realized in such a manner that they form a type of elongated hole with the length z1 in the z direction, comprising in the x direction or circumferential direction a low-tolerance dimension x1. In this way, the fastening openings 29 interact in the x direction, i.e. in the pulling direction, in each case with centering portions 21b of the fastening elements 21a. As a result, play-free torque or rotary angle transmission is produced.

The sliding block 30 is arranged parallel to the axis of the respective wheel 12a, 14a, 19, 25. In addition, the respective wheel 12a, 14a, 19, 25 can comprise an axial groove 31 (see FIG. 12), the cross section of which (e.g. trapezoidal) corresponds with the cross section of the sliding block 30. Two ends of the respective transmission element 20, 20' are fastened with their fastening portions 20a, 20'a under the sliding block 30 on a wheel of the wheels 12a, 14a, 19, 25, whereas only one fastening portion 20a, 20'a is fastened on the other wheel 12a, 14a, 19, 25 which is coupled therewith and located opposite.

It is naturally also conceivable for the fastening portions 20a, 20'a not to be realized parallel to the axis of the respective wheel 12a, 14a, 19, 25, but, for example, at an angle, it being possible for the sliding block 30 to be arranged in a corresponding manner. Other forms of fastening portions 20a, 20'a are also possible, such as, for example, toothings, also with rounded teeth.

FIG. 12 also shows a variant of the wheels 12a, 14a 19, 25 or rollers 23, 24, the wheel of said variant comprising circumferential grooves 22a which are arranged in the axial direction. The circumferential grooves 22a serve, just as the openings 22, for the purpose of any dirt that may arise being removed into the interior of the wheels 12a, 14a, 19, 25 or rollers 23, 24 and then being pressed out at the bottom end face. In this way, an application of dirt between the wheels 12a, 14a, 19, 25 or rollers 23, 24 and the respective transmission elements 20, 20'' is almost excluded. It is naturally also possible for the wheels 12a, 14a, 19, 25 or the rollers 23, 24 to be able to comprise neither circumferential grooves 22a nor openings 22.

The wheel 12a, 14a, 19, 25 shown in FIG. 12 is provided with a profile as an axis receiving means, as a result of which simple non-rotatable mounting is possible. Other profiles are naturally possible. In addition, the wheel 12a, 14a, 19, 25 of the variant according to FIG. 12 comprises openings 33 which extend through parallel to the axis of the wheel 12a, 14a, 19, 25 and serve, on the one hand, for weight saving and, on the other and, for dirt removal.

Figure 13:
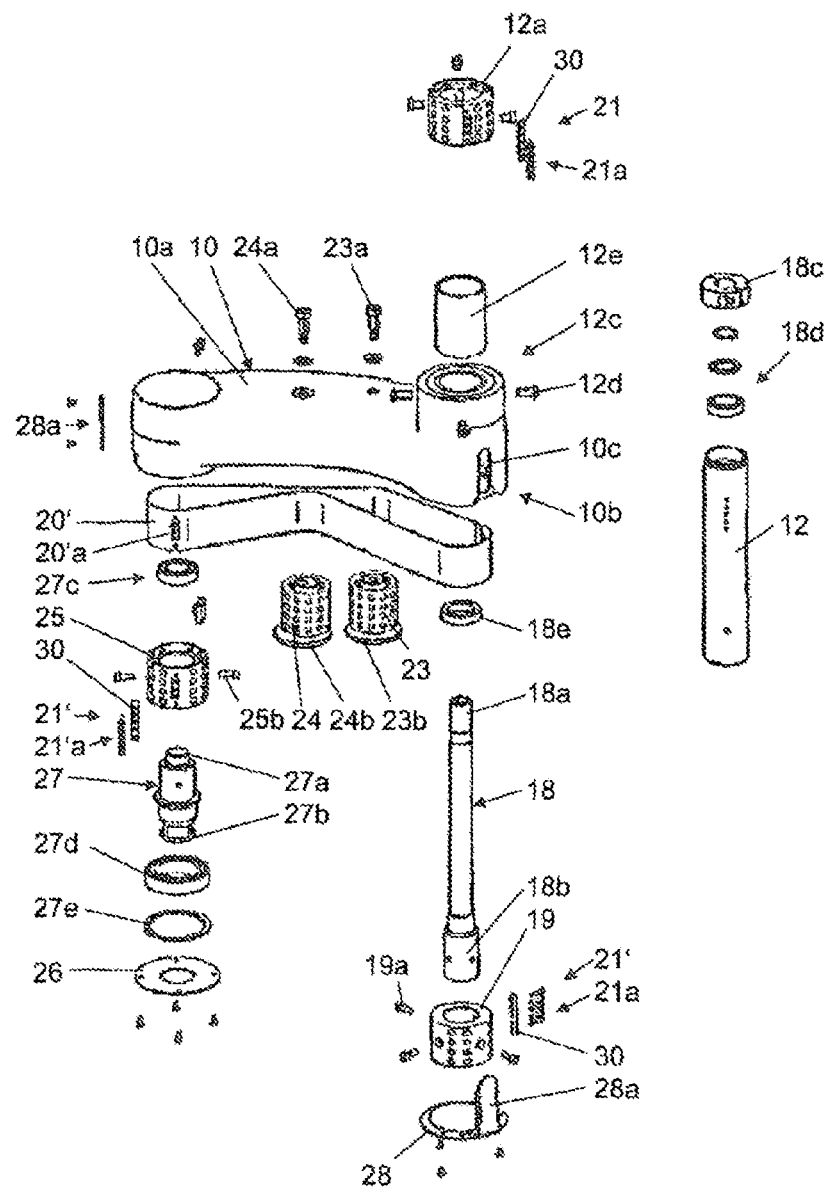
FIG. 13 shows a schematic, perspective exploded drawing of functional components of the arm device according to the invention from FIG. 8.

FIG. 13 finally provides a schematic exploded drawing in perspective of functional components of the arm device 6 according to the invention according to FIG. 8.

The assembling of the individual functional components can also be seen in FIG. 13. Thus, for example, the fastening element 23a and the actuating element 24a are introduced from the top surface of the arm 10, whereas the associated rollers 23, 24 are installed from below.

The wheels 12a, 19 and 25 are non-rotatably fastened onto the respective shafts in each case with fastening elements (e.g. 19a, 25b).

The arm 10 can be, for example, a cast or also a welded part. A divided housing 10a is also possible. The mounting opening 10c can be seen clearly here.

The holder shaft 27 is mounted in a bearing 27c by way of a drive end 27a. An output end 27b passes through a further, bottom bearing 27d, the bearing 27d being mounted on a portion of the holder shaft 27 which is realized for this purpose and is not designated in any more detail. The holder shaft 27 is inserted in the arm with the bearing 27c in front, it being secured axially in a bore of the arm 10 by way of a locking ring 27e. The locking ring 27e, in this case, interacts with the outside ring of the bottom bearing 27d. This will be explained in more detail below with reference to FIG. 14.

It is possible to reach the respective fastening devices 21' by means of the mounting openings 10c.

The outside diameters of the wheels 12a, 14a, 19, 25 are dimensioned such that the respective transmission element 20, 20' remains in the resilient region. In other words, the associated minimum bending radii of the respective material of the transmission elements 20, 20' must be respected.

The transmission elements 20, 20' are flat steel bands produced from spring steel, for example from stainless spring steel 1.4107.

The wheels 12a, 14a, 19, 25 and rollers 23, 24 can be produced from a suitable plastics material as they do not transmit high load-bearing forces, for the arm 10 is held by means of the arm drive shaft 12 with the bearing unit 17, the milking cluster 5 being held and mounted in the arm 10 by means of the holder 11 via the holder shaft 27 and the bearings 27c, 27d thereof.

Figure 14:
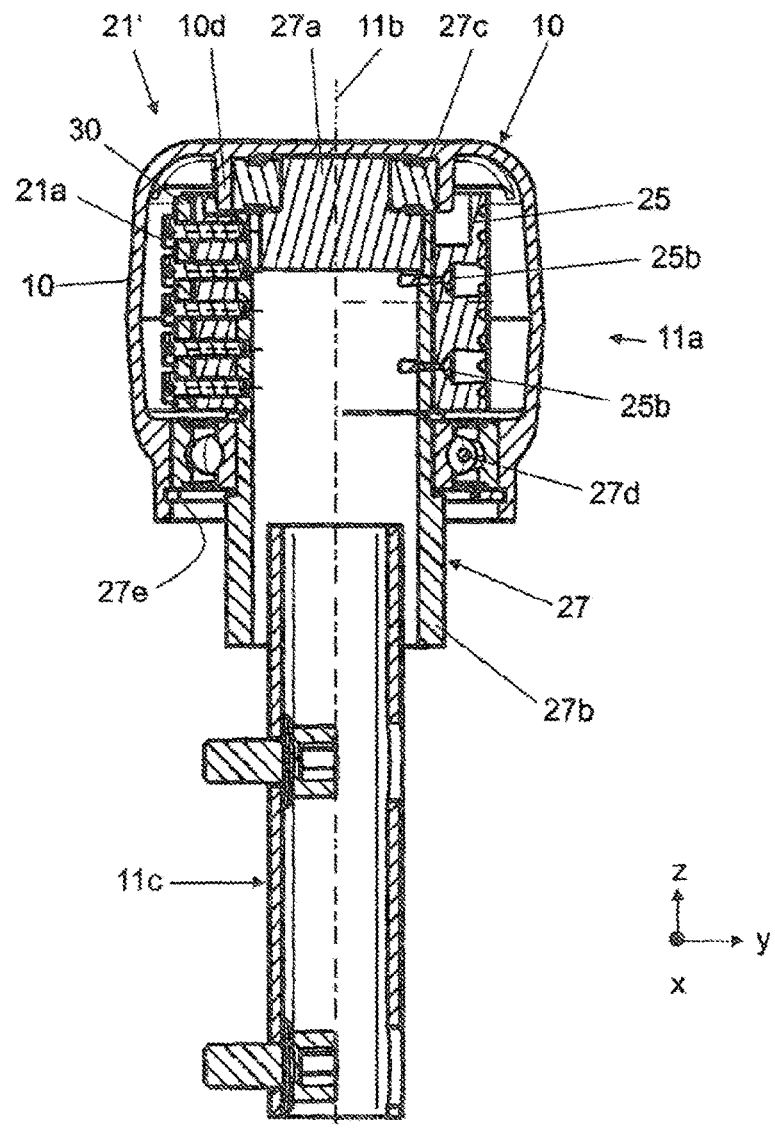
FIG. 14 shows a sectional view of a holder joint.

FIG. 14 shows a sectional view of a holder joint 11a in a vertical plane. The bearing 27c on the drive end 27a of the holder shaft is received in a corresponding receiving means 10d. The locking ring 27a is inserted in a groove in a bore (not shown in any detail) of the housing 10a and secures the bottom bearing 27d in the axial direction and consequently fixes the holder shaft 27 with the mounted holder drive wheel 25. The holder drive wheel 25 is connected to the holder shaft 27 so as to be non-rotatable by means of fastening elements 25b, for example screws or rivets.

The output end 27b of the holder shaft 27 is non-rotatably coupled in a manner which is not described in any more detail with a holder connecting device 11c which is not described in any more detail. The holder 11 is mounted on the holder connecting device 11c in a manner which is not shown in any more detail, for example by means of screws, which are indicated in FIG. 14.

Figure 15:
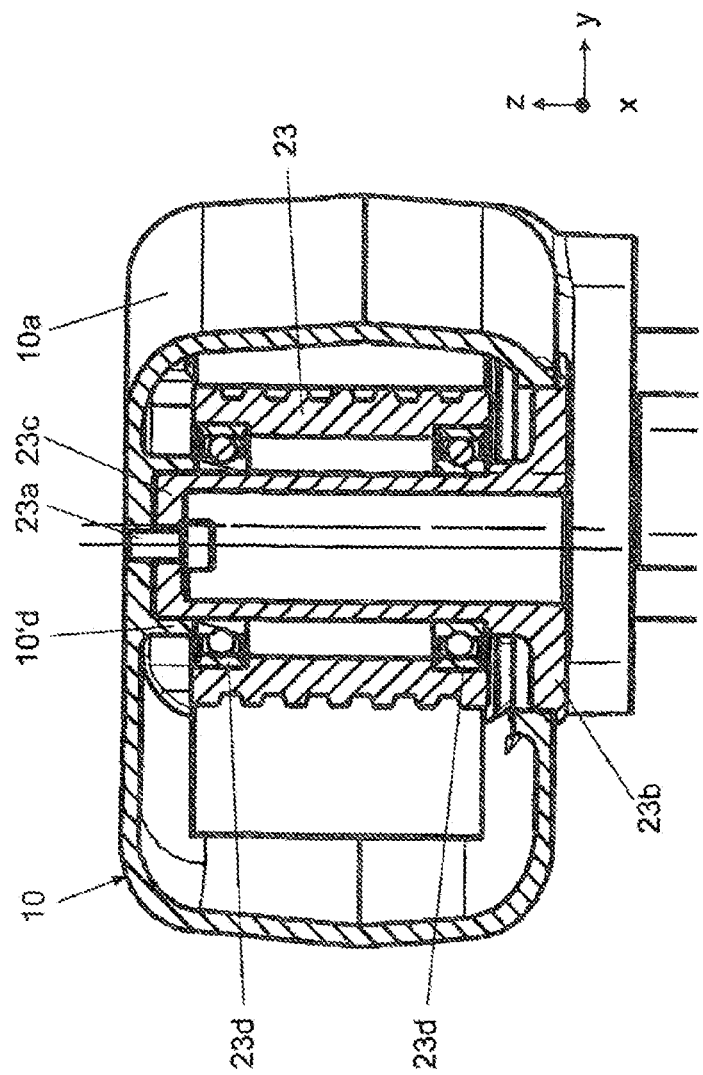
FIG. 15 shows a sectional view of an installed pressing roller.

FIG. 15 shows a sectional view of an installed pressing roller 23. The section plane is in a vertical plane. Here, in contrast to FIGS. 8 and 9, a variant of the mounting of the guide roller 23 is shown. The guide roller 23 is mounted via two bearings 23d on a journal 23c so as to be rotatable about an axis arranged in the vertical direction z. In this case, a top end of the journal 23c is received in a corresponding receiving means 10'd and is fastened on the top inside surface of the housing 10a by means of the fastening element 23a (here reachable from below). The bottom end of the journal 23c is realized with the plate 23b.

The relatively heavy motors of the drive unit 9 and/or associated transmissions, namely the arm drive 14, the holder drive 15 and the vertical drive 16, are arranged with their arrangements in the frame 90. In addition, the arm drive shaft 12 with the holder drive shaft 18 with the associated bearing unit 17 are also installed in the frame 90. Said entire arrangement is installed in the center portion 4g of the divider 4 and consequently forms a base for the movable arm 10 and the holder 11, which is movably mounted thereon, with the milking cluster 5. In this way, said relatively heavy motors and/or transmissions are not accommodated on or in the arm 10 or on or in the holder 11 or in the associated joints 12b, 11a, but are mounted in the base. This results in the weight of the arm 10 and of the holder 11 being considerably reduced compared to arm devices with integrated motors and transmissions. In other words, the arm 10 and the holder 11 only exert a small amount of kinetic energy in the x-y planes in operation (only slow movements with less accuracy are effected in the z direction). This, in turn, produces the advantage that a milker and the automatic arm device 6 with the milking cluster 5 are able to operate at the same time on the animal to be milked in a milking operation (positioning, attaching, milking, possible re-attaching, removing). A particular protected area is consequently not necessary. In addition, actuation of the arm unit in x-y planes is simplified as the arm unit comprises significantly less lag on account of the reduced inertia and requires smaller acceleration forces.

The arm device 6 with the transmission elements 20, 20' consequently achieves the following particular advantages:

Very low tolerances, even after a long service life.
No element elasticities.
The arm device 6 only exerts a small amount of kinetic energy in x-y planes as no heavy motors and/or transmissions are installed in the arm joint 12b and in the holder joint 11a.
As a result of the small amount of kinetic energy, man/milker and robot are able to work at the same time on the animal to be milked (cow) during a milking operation. No protected space is necessary.
Almost no creeping of the tensile means/transmission elements 20, 20' (this is in particular for ease of operation, manually attaching the teat cups 5a, tracking a moving animal), creeping to be understood as deforming of the material of the transmission means, e.g. by mechanical actions such as kneading, pressing or pulling.
Insensitivity to temperature oscillations.
Only small additional moving masses in the TCP (tool center point) (in particular when using plastic deflection rollers), better and quicker adjustability being produced as a result.
Spring steel band is not a wear part.
There is no polygonal effect (such as in the case of connecting rods, chains, toothed belts), better and quicker adjustability being produced as a result.
No great prestressing forces necessary, less forces on bearing points as a result.
Weight saving as a result of using plastics material as the material for many parts (wheels and rollers).
Substantially freedom from play, simple restorability of the milking cluster when scraping/removing/falling down.
Reduced risk of injury to the animals to be milked.

The invention is not restricted to the exemplary embodiments shown above, but is modifiable within the framework of the accompanying claims.

The transmission elements 20, 20' can also only be realized in part with a metal band, the portions between the wheels 12a, 14a, 19, 25 comprising in each case a metal band, and the portions which wrap around the wheels 12a, 14a, 19, 25, having a certain flexibility for this purpose, being produced, for example, from a cloth material. In other words, the transmission elements 20, 20' can be flexible in part.

It is also conceivable for the transmission elements 20, 20' to comprise metal cable fibers, these having the same characteristics as the metal band with reference to freedom from play and resistance to wear. Thus, it is also conceivable, for example, that scrapers, which interact with the respective transmission element 20, 20' at a suitable position, can be provided additionally for dirt removal.

Each milking parlor 3 can have a feeding device.

The milking cluster can naturally also be used for milk-producing animals with udders which have a different number of teats, for example, 2, 3 or 4.

The milking parlor arrangement 1 as a rotary milking parlor can be realized such that several 360° rotations can be effected for a milking operation of a certain animal when this is necessary. The animal is then prevented from exiting out of the milking parlor 3 when it arrives at the exit 8.

It is additionally conceivable for the arm device 6 with the transmission elements 20, 20' also to be able to be used for further robot applications.

The invention claimed is:

1. An arm device for supporting a milking cluster in a milking parlor arrangement for automatically milking milk-producing animals, the arm device comprising:
an arm drive shaft defining an arm axis;
an arm rotatably joined to the arm drive shaft for movement about the arm axis;
a milking cluster holder pivotably coupled to the arm;
a holder drive shaft mounted at least partially in the arm drive shaft so as to be rotatable independently of the arm drive shaft;
a drive unit couplable to the arm drive shaft and the holder drive shaft;
an arm drive transmission element operatively engaged between the drive unit and the arm drive shaft;

a holder drive transmission element operatively engaged between the holder drive shaft and the milking cluster holder;
an arm drive wheel, operatively engaged with the arm shaft and the arm drive transmission element; and
a holder drive wheel operatively engaged with the holder drive shaft and the holder drive transmission element.

2. The arm device of claim 1, wherein the arm drive transmission element includes a metal band.

3. The arm device of claim 1, wherein the arm drive transmission element is a spring steel band.

4. The arm device of claim 1, wherein the arm drive transmission element is a spring steel band produced from a stainless steel.

5. The arm device of claim 1, wherein the holder drive transmission element is operatively engaged with a plurality of rollers.

6. The arm device of claim 5, wherein the rollers each have an outside diameter which is greater than a minimum bending radius of the holder drive transmission element.

7. The arm device of claim 5, wherein the holder drive transmission element has a width corresponding to an outside diameter of each of the rollers.

8. The arm device of claim 1, wherein the arm drive wheel has an outside diameter which is greater than a minimum bending radius of the arm drive transmission element.

9. The arm device of claim 1, wherein the arm drive transmission element has a width corresponding to an outside diameter of the arm drive wheel.

10. The arm device of claim 1, wherein the arm drive wheel defines dirt removal openings.

11. The arm device of claim 1, and further comprising:
a guide roller engaged with the holder drive transmission element, and prestressing roller engaged with the holder drive transmission element.

12. The arm device of claim 1, and further comprising:
a fastening device engaged with the arm drive transmission element, wherein the fastening device includes a fastening element and a sliding block.

13. The arm device of claim 12, wherein the fastening element of the fastening device comprises a centering portion which interacts in a substantially play-free manner with a fastening opening of the arm drive transmission element in a pulling direction of the transmission element.

14. The arm device of claim 13, wherein the fastening opening of the arm drive transmission element has a length substantially parallel to an axis of the respective wheel.

15. The arm device of claim 1, wherein the holder drive transmission element is arranged on the arm.

16. The arm device of claim 15, and further comprising:
a guide roller arranged on the arm and engaged with the holder drive transmission element; and
a prestressing pressing roller arranged on the arm and engaged with the holder drive transmission element.

17. The arm device of claim 16, wherein the guide roller and the prestressing pressing roller are disposed at least partially in the arm.

18. The arm device of claim 1, wherein the arm comprises a housing.

19. The arm device of claim 1, wherein a mounting opening is defined by the arm.

20. The arm device of claim 1, and further comprising:
a frame; and
wherein the drive unit comprises; an arm drive joined to the frame, a holder drive joined to the frame, and a vertical drive joined to a frame.

21. The arm device of claim 20, and further comprising:
a stressing device operatively engaged with the holder drive transmission element and the stressing device is activated by displacement of the arm drive.

22. The arm device of claim 20, wherein the arm drive, the holder drive and the vertical drive of the drive unit; the holder drive transmission element; and a bearing unit of the arm drive shaft and of the holder drive shaft form a common base of the arm device in the frame.

23. The arm device of claim 1, wherein the arm and the milking cluster holder are pivotable independently of one another.

24. The arm device of claim 1, and further comprising:
a plurality of rollers operatively engaged with the holder drive shaft transmission element, wherein at least one of the rollers defines dirt removal openings.

25. The arm device of claim 1, wherein the holder drive transmission element is disposed at least partially in the arm.

26. A divider for a milking parlor arrangement for a milking parlor for milking milk-producing animals, wherein the divider arranged on a longitudinal side of the milking parlor, and the divider comprises:
a drive unit;
an arm device coupled to the drive unit;
an arm;
a milking cluster holder, pivotably coupled to the arm for movement between a park position and an operating position, wherein in the park position the arm device is arranged with the milking cluster holder in the divider and in the operating position is adjustable laterally to an animal milking position, wherein the arm device comprises:
a holder drive shaft mounted at least partially in the arm drive shaft so as to be rotatable independently of the arm drive shaft;
a drive unit couplable to the arm drive shaft and the holder drive shaft;
an arm drive transmission element operatively engaged between the drive unit and the arm drive shaft;
a holder drive transmission element operatively engaged between the holder drive shaft and the milking cluster holder;
an arm drive wheel, operatively engaged with the arm shaft and the arm drive transmission element; and
a holder drive wheel operatively engaged with the holder drive shaft and the holder drive transmission element.

27. The divider of claim 26, wherein the arm device is automatically adjustable between the park position and the operating position and further into an attachment position for automatically attaching a milking cluster onto the teats of the animal to be milked, and the divider further comprises:
a milking cluster position sensor.

28. The divider of claim 26, wherein the arm device is adjustable between the park position and the operating position, wherein the operating position is a fixed preliminary position which is determinable in advance as a result of a stop, and wherein the milking cluster is in a milker accessible position.

29. The divider of claim 26, wherein the arm drive, the holder drive, a vertical drive of the drive unit, and a bearing unit of the arm drive shaft and of the holder drive shaft form a common base of the arm device in a frame arranged in a center portion of the divider.

30. A milking parlor arrangement for milking milk-producing animals, the milking parlor arrangement, comprising:
a divider for a milking parlor arrangement for a milking parlor for milking milk-producing animals, wherein the divider arranged on a longitudinal side of the milking parlor, and the divider comprises:

a drive unit;

an arm device coupled to the drive unit;

an arm;

a milking cluster holder, pivotably coupled to the arm for movement between a park position and an operating position, wherein in the park position the arm device is arranged with the milking cluster holder in the divider and in the operating position is adjustable laterally to an animal milking position, wherein the arm device comprises:

a holder drive shaft mounted at least partially in the arm drive shaft so as to be rotatable independently of the arm drive shaft;

a drive unit couplable to the arm drive shaft and the holder drive shaft;

an arm drive transmission element operatively engaged between the drive unit and the arm drive shaft;

a holder drive transmission element operatively engaged between the holder drive shaft and the milking cluster holder;

an arm drive wheel, operatively engaged with the arm shaft and the arm drive transmission element; and a holder drive wheel operatively engaged with the holder drive shaft and the milking cluster holder holder drive transmission element;

wherein the arm drive, the holder drive and the vertical drive of the drive unit transmissions and a bearing unit of the arm drive shaft and of the holder drive shaft are disposed on the frame.

31. The milking parlor arrangement of claim 30, wherein the milking parlor is a rotary milking parlor.

32. The milking parlor arrangement of claim 31, wherein the rotary milking parlor is an external rotary milking parlor.

* * * * *